US010433160B2

(12) United States Patent
Horn et al.

(10) Patent No.: US 10,433,160 B2
(45) Date of Patent: *Oct. 1, 2019

(54) USING IDENTIFIERS TO ESTABLISH COMMUNICATION

(71) Applicant: QUALCOMM Incorporated, San Diego, CA (US)

(72) Inventors: Gavin B. Horn, La Jolla, CA (US); Parag A. Agashe, San Diego, CA (US); Rajat Prakash, San Diego, CA (US); Rajarshi Gupta, Sunnyvale, CA (US); Masato Kitazoe, Tokyo (JP); Nathan E. Tenny, Poway, CA (US); Oronzo Flore, Ostuni (IT)

(73) Assignee: QUALCOMM Incorporated, San Diego, CA (US)

( * ) Notice: Subject to any disclaimer, the term of this patent is extended or adjusted under 35 U.S.C. 154(b) by 705 days.

This patent is subject to a terminal disclaimer.

(21) Appl. No.: 14/610,171

(22) Filed: Jan. 30, 2015

(65) Prior Publication Data
US 2015/0140993 A1 May 21, 2015

Related U.S. Application Data

(62) Division of application No. 12/269,676, filed on Nov. 12, 2008, now Pat. No. 9,648,493.
(Continued)

(51) Int. Cl.
*G06F 15/16* (2006.01)
*H04W 36/00* (2009.01)
(Continued)

(52) U.S. Cl.
CPC ............ *H04W 8/26* (2013.01); *H04W 48/08* (2013.01); *H04W 76/18* (2018.02); *H04W 24/02* (2013.01);
(Continued)

(58) Field of Classification Search
CPC ..... H04W 8/26; H04W 76/027; H04W 48/08; H04W 36/30; H04W 88/08;
(Continued)

(56) References Cited

U.S. PATENT DOCUMENTS

| 5,345,467 A | 9/1994 | Lomp et al. |
| 5,519,706 A | 5/1996 | Bantz et al. |

(Continued)

FOREIGN PATENT DOCUMENTS

| CN | 1568043 A | 1/2005 |
| CN | 1691828 A | 11/2005 |

(Continued)

OTHER PUBLICATIONS

"3rd Generation Partnership Protect; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard; 3GPP TS 36.300,3rd Generation Partnership Project (3GPP), Mobile Competence Centre ; 650, Route Des Lucioles ; F-06921 Sophiaantipoliscedex ; France, No. V8.4.0, Mar. 1, 2008 (Mar. 1, 2008), pp. 1-126, XP050377579.

(Continued)

*Primary Examiner* — Hitesh Patel
*Assistant Examiner* — Clifton Houston
(74) *Attorney, Agent, or Firm* — Anthony R. Morris

(57) ABSTRACT

Confusion resulting from assigning the same node identifier to multiple nodes is resolved through the use of confusion detection techniques and the use of unique identifiers for the nodes. In some aspects an access point and/or an access terminal may perform operations relating to detecting confusion and/or providing a unique identifier to resolve confusion.

27 Claims, 21 Drawing Sheets

Related U.S. Application Data

(60) Provisional application No. 60/988,646, filed on Nov. 16, 2007, provisional application No. 61/059,654, filed on Jun. 6, 2008, provisional application No. 61/074,114, filed on Jun. 19, 2008, provisional application No. 61/074,935, filed on Jun. 23, 2008.

(51) Int. Cl.
*H04W 8/26* (2009.01)
*H04W 48/08* (2009.01)
*H04W 76/18* (2018.01)
*H04W 24/02* (2009.01)
*H04W 72/04* (2009.01)
*H04W 36/30* (2009.01)
*H04W 84/04* (2009.01)
*H04W 88/08* (2009.01)

(52) U.S. Cl.
CPC ............ *H04W 36/30* (2013.01); *H04W 72/04* (2013.01); *H04W 84/045* (2013.01); *H04W 88/08* (2013.01)

(58) Field of Classification Search
CPC ... H04W 84/045; H04W 72/04; H04W 16/00; H04W 72/085; H04W 24/08; H04W 36/0083; H04W 36/0061; H04W 36/08; H04W 24/02; H04W 24/04; H04J 11/0093; H04L 65/4076
See application file for complete search history.

(56) References Cited

U.S. PATENT DOCUMENTS

| | | | |
|---|---|---|---|
| 5,673,259 A | 9/1997 | Quick, Jr. | |
| 5,722,073 A | 2/1998 | Wallstedt et al. | |
| 6,032,047 A | 2/2000 | Cerwall et al. | |
| 6,044,272 A | 3/2000 | Kobylinski et al. | |
| 6,061,337 A * | 5/2000 | Light | H04W 36/32 370/331 |
| 6,201,969 B1 | 3/2001 | Meier | |
| 6,253,083 B1 | 6/2001 | Hacena et al. | |
| 6,285,874 B1 | 9/2001 | Magnusson et al. | |
| 6,353,602 B1 | 3/2002 | Cheng et al. | |
| 6,522,881 B1 | 2/2003 | Feder et al. | |
| 6,553,230 B1 | 4/2003 | Plestid et al. | |
| 6,597,671 B1 | 7/2003 | Ahmadi et al. | |
| 6,615,050 B1 | 9/2003 | Tiedemann, Jr. et al. | |
| 6,680,920 B1 | 1/2004 | Wan | |
| 6,873,612 B1 | 3/2005 | Steer et al. | |
| 7,310,518 B2 | 12/2007 | Chambers | |
| 7,596,378 B1 | 9/2009 | Nizri et al. | |
| 7,813,320 B2 | 10/2010 | Kim et al. | |
| 7,876,729 B1 | 1/2011 | Grilli et al. | |
| 7,961,682 B2 * | 6/2011 | Zhao | H04W 36/0066 370/331 |
| 8,027,681 B2 | 9/2011 | Burgess et al. | |
| 8,400,979 B2 | 3/2013 | Smee et al. | |
| 8,743,858 B2 | 6/2014 | Tinnakornsrisuphap et al. | |
| 9,094,880 B2 | 7/2015 | Prakash et al. | |
| 2001/0000136 A1 | 4/2001 | Dixon et al. | |
| 2004/0063428 A1 | 4/2004 | Jansson | |
| 2004/0138807 A1 | 7/2004 | Jha et al. | |
| 2004/0203863 A1 * | 10/2004 | Huomo | G01S 5/02 455/456.1 |
| 2004/0240474 A1 | 12/2004 | Fan | |
| 2005/0030924 A1 | 2/2005 | Yano et al. | |
| 2005/0048922 A1 | 3/2005 | Lee et al. | |
| 2005/0124345 A1 | 6/2005 | Laroia et al. | |
| 2005/0148368 A1 * | 7/2005 | Scheinert | H04W 24/02 455/561 |
| 2005/0225444 A1 * | 10/2005 | Clift | G06K 17/00 340/539.13 |
| 2005/0243772 A1 | 11/2005 | Lee et al. | |
| 2006/0056351 A1 | 3/2006 | Wall | |
| 2006/0098752 A1 | 5/2006 | Song et al. | |
| 2006/0121900 A1 | 6/2006 | Idnani et al. | |
| 2006/0146751 A1 | 7/2006 | Obuchi et al. | |
| 2006/0172707 A1 | 8/2006 | Stern-Berkowitz et al. | |
| 2006/0189316 A1 * | 8/2006 | Kobylinski | H04W 36/0061 455/436 |
| 2006/0227754 A1 | 10/2006 | Ko et al. | |
| 2006/0234713 A1 | 10/2006 | Oswal et al. | |
| 2006/0280141 A1 | 12/2006 | McBeath et al. | |
| 2007/0097897 A1 | 5/2007 | Teague et al. | |
| 2007/0097914 A1 | 5/2007 | Grilli et al. | |
| 2007/0097938 A1 | 5/2007 | Nylander et al. | |
| 2007/0097939 A1 | 5/2007 | Nylander et al. | |
| 2007/0135147 A1 | 6/2007 | Declerck et al. | |
| 2007/0153728 A1 | 7/2007 | Le et al. | |
| 2007/0213086 A1 * | 9/2007 | Claussen | H04W 16/18 455/513 |
| 2007/0254620 A1 * | 11/2007 | Lindqvist | H04W 48/12 455/403 |
| 2007/0287501 A1 | 12/2007 | Hoshina et al. | |
| 2007/0291699 A1 | 12/2007 | Lee et al. | |
| 2007/0291728 A1 | 12/2007 | Dalsgaard et al. | |
| 2007/0298803 A1 | 12/2007 | Kawabata et al. | |
| 2008/0013489 A1 | 1/2008 | Anigstein et al. | |
| 2008/0014926 A1 | 1/2008 | Ono | |
| 2008/0076425 A1 * | 3/2008 | Khetawat | H04W 88/12 455/436 |
| 2008/0132239 A1 * | 6/2008 | Khetawat | H04W 36/12 455/438 |
| 2008/0146226 A1 | 6/2008 | Claussen et al. | |
| 2008/0153497 A1 | 6/2008 | Kalhan | |
| 2008/0159222 A1 | 7/2008 | Akram et al. | |
| 2008/0207207 A1 * | 8/2008 | Moe | H04J 11/0093 455/439 |
| 2008/0227458 A1 | 9/2008 | Wu | |
| 2008/0267153 A1 | 10/2008 | Mukherjee et al. | |
| 2008/0280620 A1 * | 11/2008 | Chin | H04W 48/08 455/446 |
| 2008/0304439 A1 * | 12/2008 | Keevill | H04L 12/5692 370/328 |
| 2009/0016314 A1 | 1/2009 | Kim | |
| 2009/0047955 A1 * | 2/2009 | Frenger | H04J 11/0093 455/436 |
| 2009/0047956 A1 * | 2/2009 | Moe | H04J 11/0093 455/436 |
| 2009/0047960 A1 | 2/2009 | Gunnarsson et al. | |
| 2009/0052395 A1 | 2/2009 | Bao et al. | |
| 2009/0052418 A1 | 2/2009 | Semper | |
| 2009/0088161 A1 | 4/2009 | Narasimha et al. | |
| 2009/0092107 A1 | 4/2009 | Cai et al. | |
| 2009/0093252 A1 | 4/2009 | Czaja et al. | |
| 2009/0097448 A1 | 4/2009 | Vasudevan et al. | |
| 2009/0097451 A1 | 4/2009 | Gogic | |
| 2009/0129291 A1 * | 5/2009 | Gupta | H04W 8/26 370/254 |
| 2009/0129350 A1 | 5/2009 | Khandekar et al. | |
| 2009/0129354 A1 | 5/2009 | Gupta et al. | |
| 2009/0132674 A1 * | 5/2009 | Horn | H04W 36/30 709/207 |
| 2009/0132675 A1 * | 5/2009 | Horn | H04W 8/26 709/207 |
| 2009/0156208 A1 | 6/2009 | Vesterinen et al. | |
| 2009/0168745 A1 | 7/2009 | Ahmadi et al. | |
| 2009/0176490 A1 | 7/2009 | Kazmi et al. | |
| 2009/0196253 A1 | 8/2009 | Semper | |
| 2009/0219888 A1 | 9/2009 | Chen et al. | |
| 2009/0233601 A1 * | 9/2009 | Vikberg | H04W 36/14 455/436 |
| 2009/0233607 A1 | 9/2009 | Claussen et al. | |
| 2009/0252125 A1 | 10/2009 | Vujcic | |
| 2009/0270092 A1 | 10/2009 | Buckley et al. | |
| 2009/0270097 A1 | 10/2009 | Gallagher et al. | |
| 2009/0275333 A1 | 11/2009 | Ishii et al. | |
| 2009/0280819 A1 | 11/2009 | Brisebois et al. | |
| 2009/0298515 A1 | 12/2009 | Czaja et al. | |
| 2009/0312024 A1 | 12/2009 | Chen et al. | |
| 2009/0316654 A1 | 12/2009 | Prakash et al. | |

(56) References Cited

U.S. PATENT DOCUMENTS

| | | | |
|---|---|---|---|
| 2009/0316655 A1* | 12/2009 | Prakash | H04W 36/0088 370/331 |
| 2010/0008235 A1* | 1/2010 | Tinnakornsrisuphap | H04L 29/12264 370/241 |
| 2010/0040019 A1 | 2/2010 | Tinnakornsrisuphap et al. | |
| 2010/0067371 A1* | 3/2010 | Gogic | H04W 36/0083 370/216 |
| 2010/0130199 A1 | 5/2010 | Piercy et al. | |
| 2010/0216426 A1* | 8/2010 | Karim | H04W 48/08 455/410 |
| 2010/0260068 A1 | 10/2010 | Bhatt et al. | |
| 2011/0014920 A1* | 1/2011 | Nylander | H04W 36/20 455/442 |
| 2011/0039557 A1 | 2/2011 | Narasimha et al. | |
| 2011/0051658 A1 | 3/2011 | Jin et al. | |
| 2011/0263274 A1 | 10/2011 | Fox et al. | |
| 2013/0003695 A1* | 1/2013 | Nylander | H04W 36/0083 370/331 |
| 2013/0150046 A1* | 6/2013 | Gogic | H04W 36/0083 455/436 |

FOREIGN PATENT DOCUMENTS

| | | |
|---|---|---|
| CN | 1934884 A | 3/2007 |
| CN | 101014156 A | 8/2007 |
| EP | 1107637 A1 | 6/2001 |
| EP | 1450523 A3 | 12/2004 |
| EP | 1928194 A1 | 6/2008 |
| EP | 2079263 A1 | 7/2009 |
| JP | 2000312379 A | 11/2000 |
| JP | 2002525913 A | 8/2002 |
| JP | 2003219459 A | 7/2003 |
| JP | 2004140459 A | 5/2004 |
| JP | 2006141031 A | 6/2006 |
| JP | 2008005074 A | 1/2008 |
| JP | 2008053870 A | 3/2008 |
| JP | 2008092179 A | 4/2008 |
| JP | 2008118227 A | 5/2008 |
| JP | 2010500793 A | 1/2010 |
| JP | 2010514352 A | 4/2010 |
| JP | 2010517366 A | 5/2010 |
| KR | 20060128694 A | 12/2006 |
| KR | 20070051954 A | 5/2007 |
| KR | 100777096 B1 | 11/2007 |
| RU | 2209528 C2 | 7/2003 |
| RU | 2265287 C2 | 11/2005 |
| RU | 2316894 C2 | 2/2008 |
| RU | 2341900 C2 | 12/2008 |
| TW | 200820809 A | 5/2008 |
| WO | 1996037079 | 11/1996 |
| WO | 9839940 | 9/1998 |
| WO | 0016518 A2 | 3/2000 |
| WO | 2001067788 | 9/2001 |
| WO | 0243430 A1 | 5/2002 |
| WO | 2004010607 A1 | 1/2004 |
| WO | 2004019650 | 3/2004 |
| WO | 04064294 | 7/2004 |
| WO | 2004114695 A1 | 12/2004 |
| WO | 2005029894 A1 | 3/2005 |
| WO | 2005078966 A1 | 8/2005 |
| WO | 2005107169 A1 | 11/2005 |
| WO | WO 2006061671 A1 * | 6/2006 ............ H04W 36/14 |
| WO | WO-2006061671 A1 * | 6/2006 ............ H04W 36/14 |
| WO | 07010304 | 1/2007 |
| WO | 2007051182 A1 | 5/2007 |
| WO | 2007094320 A1 | 8/2007 |
| WO | 2007103062 A1 | 9/2007 |
| WO | 2007113154 A1 | 10/2007 |
| WO | 2008019557 A1 | 2/2008 |
| WO | 2008055251 A2 | 5/2008 |
| WO | 2008073554 | 6/2008 |
| WO | 2008076222 | 6/2008 |
| WO | 2008094333 A1 | 8/2008 |
| WO | 2008104196 A1 | 9/2008 |
| WO | WO 2008113373 A1 * | 9/2008 ............ H04J 11/0069 |
| WO | WO-2008113373 A1 * | 9/2008 ............ H04J 11/0069 |
| WO | 2009064647 A1 | 5/2009 |
| WO | 2009067454 A1 | 5/2009 |

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008 (May 1, 2008), pp. 1-151, XP050377645.

Ericsson: "Automatic neighbour cell configuration", 3GPP Draft; S5-071484, 3rd Generation Partnership Project (3GPP), Mobile Competence Centre; Sophia-Antipolis Cedex ; France, (Aug. 2007), XP050306143, paragraph 3.4.

Ericsson, "MCI conflict detection and resolution", 3GPP Draft; S5-071569, 3rd Generation Partnership Project (3GPP), Mobile Competence Centre; 650, Route Des Lucioles; F-06921 Sophia-Antipolis Cedex; France, vol. SA WG5, No. Roma; 20070822, Aug. 22, 2007, XP050306211, pp. 1-4, [retrieved on Aug. 22, 2007].

European Search Report—EP12166666—Search Authority—Munich—dated Jul. 17, 2012.

European Search Report—EP12191615—Search Authority—Munich—dated Dec. 18, 2012.

Huawei: "Detection of conflicting cell identities," 3GPP Draft; R3-071947, 3rd Generation Partnership Project (3GPP), Mobile Competence Centre; Sophia-Antipolis Cedex ; France , XP050162733 [retrieved on Oct. 3, 2007] the whole document, (Oct. 3, 2007).

Huawei, "Detection of Conflicting Cell Identities", 3GPP Draft; R2-074216, 3rd Generation Partnership Project (3GPP), Mobile Competence Centre 650, Route Des Lucioles ; F-06921 Sophia-Antipolis Cedex ; France, vol. RAN WG2, No. Shanghai, China; Oct. 2, 2007, Oct. 2, 2007, (Oct. 2, 2007), XP050136835, pp. 1-3, [retrieved on Oct. 2, 2007].

International Search Report—PCT/US08/083658, International Search Authority—European Patent Office—dated Jul. 30, 2009.

Panasonic: "UE access control in CSG cell;" 3GPP Draft; R2-082238, 3rd Generation Partnership Project (3GPP), Kansas City, USA, XP050140005, figures 1-3 paragraph [2.1]—paragraph [2.3], (Apr. 29, 2008).

Qualcomm Europe and T-Mobile: "Inter-RAT/frequency Automatic Neighbour Relation Function," 3GPP Draft TSG RAN#60; R2-074907, 3rd Generation Partnership Project (3GPP), Jeju, South Korea, XP050137407 figure 1 p. 2-p. 3, (Nov. 5-9, 2007).

Qualcomm Europe: "Connected mode mobility in the presence of PCI confusion", 3GPP Draft; R3-090699, 3rd Generation Partnership Project (3GPP), Mobile Competence Centre ; 650, Route Des Lucioles ; F-06921 Sophia-Antipolis Cedex ; France, No. Seoul, Korea; Mar. 18, 2009, Mar. 18, 2009 (Mar. 18, 2009), XP050341086, [retrieved on Mar. 18, 2009].

Qualcomm Europe (Email Rapporteur): "Summary of email discussion on Home eNB inbound mobility support [61b-LTE-B06]," 3GPP Draft TSG-RAN WG 2 meeting #62; R2-082270, 3rd Generation Partnership Project (3GPP), Kansas City, USA, XP050140027, (Apr. 29, 2008).

Qualcomm Europe et al.,"Network based solutions to inbound mobility in the presence of PCI confusion", 3GPP Draft; R3-091378, 3rd Generation Partnership Project (3GPP), Mobile Competence Centre ; 650, Route Des Lucioles ; F-06921 Sophia-Antipolis Cedex ; France, No. San Francisco, USA; May 4, 2009, May 4, 2009 (May 4, 2009), XP050341712, [retrieved on May 4, 2009].

Qualcomm Europe, "Optimized handover in the presence of PCI confusion", 3GPP Draft,R2-083268,3rd Generation Partnership Project (3GPP),Mobile Competence Centre,650,Route Des Lucioles, F-06921 Sophia-Antipolis Cedex ,France, vol. RAN WG2, No. Warsaw, Poland, Jun. 24, 2008, Jun. 24, 2008 (Jun. 24, 2008), XP050140688.

(56) References Cited

OTHER PUBLICATIONS

Taiwan Search Report—TW097144436—TIPO—dated Jan. 27, 2012.
Telecom Italia, et al., "Way forward for handover to HeNB" 3GPP Draft; R2-084534, 3rd Generation Partnership Project (3GPP), Mobile Competence Centre ; 650, Route Des Lucioles ; F-06921 Sophia-Antipolis Cedex ; France, No. Jeju; Aug. 12, 2008, Aug. 12, 2008.
Tinnakornsrisuphap, P., "Automatic Configuration Support for 1x and HRPD Femto", Qualcomm, A20-20080616-004r0, pp. 1-15, Jun. 2008.
T-Mobile: "Automatic Neighbour Cell List Configuration—required Measurement and Signalling support, Templates according to R3-071730," 3GPP DraftTSG-RAN WG3 Meeting #57bis; R3-071936, 3rd Generation Partnership Project (3GPP), Sophia Antipolis, France, XP050162723, pp. 2-4, (Oct. 3, 2007).
Written Opinion—PCT/US08/083658, International Search Authority—European Patent Office—dated Jul. 30, 2009.
ZTE: "Generation of Neighbour Relations", 3GPP Draft; R3-080077, 3rd Generation Partnership Project (3GPP), Mobile Competence Centre; 650, Route Des Lucioles; F-06921 Sophia-Antipolis Cedex; France, vol. RAN WG3, No. Sorrento, Italy; Feb. 5, 2008, Feb. 5, 2008 (Feb. 5, 2008), XP050163310 [retrieved on Feb. 5, 2008] p. 1, line 23-p. 3, line 3.

* cited by examiner

USING IDENTIFIERS TO ESTABLISH COMMUNICATION

CLAIM OF PRIORITY

This application is a divisional of U.S. patent application Ser. No. 12/269,676, entitled "USING IDENTIFIERS TO ESTABLISH COMMUNICATION", filed Nov. 12, 2008, pending, which claims the benefit of and priority to commonly owned U.S. Provisional Patent Application Ser. No. 60/988,646, entitled "APPARATUS AND METHOD TO FACILITATE RESERVATION OF RESOURCES AT AN ACCESS POINT IN SYSTEMS WITH RESTRICTED ASSOCIATION", filed Nov. 16, 2007; U.S. Provisional Patent Application Ser. No. 61/059,654, entitled "SYSTEMS AND METHODS FOR HANDOFF IN A HETEROGENEOUS DEPLOYMENT", filed Jun. 6, 2008; U.S. Provisional Patent Application Ser. No. 61/074,114, entitled "SYSTEMS AND METHODS FOR USER EQUIPMENT ASSISTED PCI CONFUSION RESOLUTION IN HETEROGENEOUS NETWORKS", filed Jun. 19, 2008; U.S. Provisional Patent Application Ser. No. 61/074,935, entitled "SYSTEMS AND METHODS FOR USER EQUIPMENT ASSISTED PCI CONFUSION RESOLUTION IN HETEROGENEOUS NETWORKS", filed Jun. 23, 2008, the disclosure of each of which is hereby incorporated by reference herein.

CROSS-REFERENCE TO RELATED APPLICATION

This application is related to commonly owned U.S. patent application Ser. No. 12/269,666, entitled "RESOLVING NODE IDENTIFIER CONFUSION," filed Nov. 12, 2008, pending, the disclosure of which is hereby incorporated by reference herein.

BACKGROUND

Field

This application relates generally to communication and more specifically, but not exclusively, to resolving confusion associated with communication nodes.

Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations (e.g., macro cells), small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem.

In practice, there may be a relatively large number of base stations (e.g., femto cells) deployed in a given area (e.g., within the coverage area of a given macro cell). In such a case, there is a need for effective techniques for identifying these base stations so that other nodes in the network may communicate with these base stations.

SUMMARY

A summary of sample aspects of the disclosure follows. It should be understood that any reference to the term aspects herein may refer to one or more aspects of the disclosure.

The disclosure relates in some aspect to resolving confusion associated with node identifiers. For example, a limited number of node identifiers may be defined within a network such that more than one node (e.g., access point) in the network may be assigned the same identifier. Accordingly, when an access terminal is being handed over from a source node to a target node, confusion may arise as to the identity the target node. Various techniques are described herein for resolving such confusion.

In some aspects an access terminal to be handed over to a target node may resolve confusion relating to the target node by acquiring a unique identifier associated with the target node. In some implementations the access terminal sends this unique identifier to a source node that initiates handover operations. In other implementations the access terminal uses the unique identifier to initiate handover operations.

An access terminal may be configured to detect confusion. In some cases an access terminal autonomously detects confusion. For example, an access terminal may monitor identifiers associated with received signals and generate measurement reports that indicate that multiple nodes are using the same identifier.

As another example, a signal threshold may be assigned to a set of identifiers that have been identified as possibly being subject to confusion. This threshold may then be used to trigger acquisition of a more unique identifier or trigger a confusion determination operation at a source node.

In some cases an access terminal detects confusion in response to a request. For example, a source node may periodically send a message to an access terminal requesting that the access terminal send confusion related information via a measurement report.

An access point may be configured to detect confusion. For example, an access point may detect confusion based on neighbor discovery, a target node identified in a handover request, or received configuration information. Upon detecting confusion, the access point may send a message to an access terminal requesting that the access terminal acquire a unique identifier to resolve the confusion. In some cases, this message may instruct the access terminal to use a unique identifier to initiate handover operations.

Confusion resolution also may be employed when an access terminal directly accesses a target node. For example, in the event an access terminal establishes communication with a target node before resources for the access terminal are acquired by the target node, the access terminal may send a unique identifier for the source node to the target node. In this way, the target node may acquire the appropriate resources from the source node even when a node identifier used by the source node is potentially confusing.

BRIEF DESCRIPTION OF THE DRAWINGS

These and other sample aspects of the disclosure will be described in the detailed description and the appended claims that follow, and in the accompanying drawings, wherein:

Figure 1:
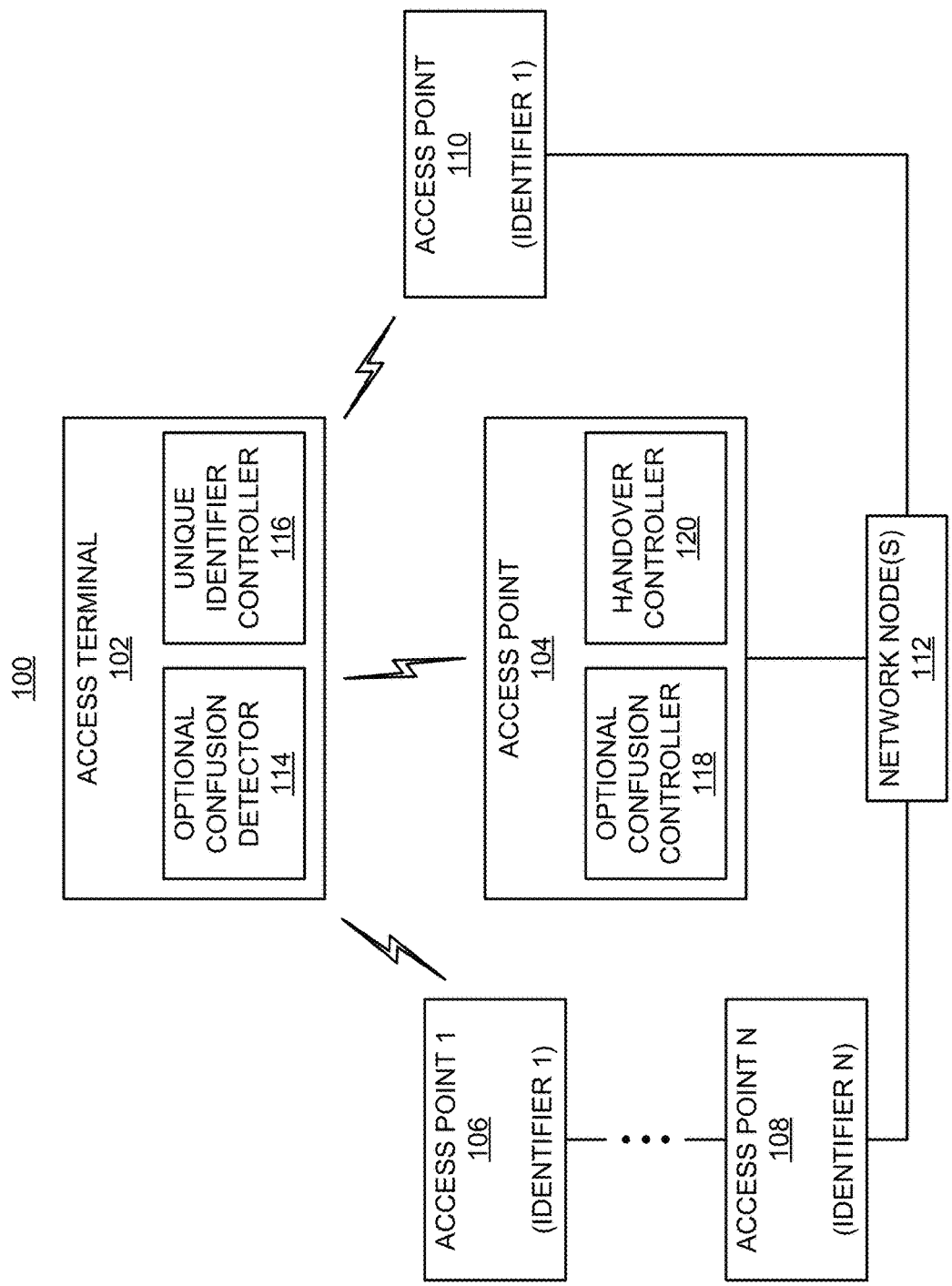
FIG. 1 is a simplified block diagram of several sample aspects of a communication system configured to resolve confusion.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology (e.g., base stations, user equipment, and so on).

Access points in the system 100 provide one or more services (e.g., network connectivity) for one or more wireless terminals (e.g., access terminal 102) that may be installed within or that may roam throughout an associated geographical area. For example, at various points in time the access terminal 102 may connect to an access point 104, any one of a set of access points 1-N (represented by access points 106 and 108 and the associated ellipsis), or an access point 110. Each of the access points 102-110 may communicate with one or more network nodes (represented, for convenience, by network node 112) to facilitate wide area network connectivity. Such network nodes may take various forms such as, for example, one or more radio and/or core network entities (e.g., a configuration manager, a mobility management entity, or some other suitable network entity).

Each access point in the system 100 is assigned a first type of identifier, referred to herein as a node identifier. In various implementations such an identifier may comprise, for example, a physical cell identifier ("PCID"), a pseudorandom number ("PN") offset, or an acquisition pilot. Typically, a fixed quantity (e.g., 504) of node identifiers is defined in a given system. In such a case, confusion may arise when the number of access points exceeds the number of node identifiers. FIG. 1 illustrates a simple example of this where the access point 106 and the access point 110 are both assigned "identifier 1."

As the access terminal 102 roams through the system 100, the access terminal 102 may be handed over from one access point (e.g., access point 104) to another access point (e.g., access point 110). A decision to hand over the access terminal 102 to the access point 110 may be based on whether the access terminal 102 is receiving particularly strong signals from the access point 110. Here, the access terminal 102 identifies signals from the access point 110 by way of the node identifier associated with (e.g., embedded within) those signals. To accomplish a handover, various information maintained by the source access point 104 (the access point to which the access terminal is currently connected) is transferred to the target access point 110. In the absence of confusion this may be accomplished through the use of the node identifier ("identifier 1") associated with the access point 110. When confusion does exist as in the example of FIG. 1, however, the access point 104 may not be able to determine whether the information should be sent to the access point 106 or the access point 110.

To resolve confusion such as this, the access terminal 102 and/or the access point 104 are configured to detect the confusion and determine a second type of identifier associated with the access point 110. In some aspects the second type of identifier comprises a unique identifier. For example, the second type of identifier may be unique within a larger region than the first type of identifier. In some implementations the second type of identifier may be unique throughout an operator's network. In various implementations such a unique identifier may comprise, for example, a global cell identifier ("GCI"), an access node identifier ("ANID"), a sector identifier, an Internet Protocol address, or some other identifier that uniquely identifies the access point 110 within a network.

In some implementations the access terminal 102 includes a confusion detector 114 that may detect actual or potential confusion between nodes in the system 100. Upon detecting confusion, the access terminal 102 (e.g., a unique identifier controller 116) may acquire the unique identifier. For example, the access terminal 102 may monitor for a signal including the unique identifier that is broadcast by the access point 110. Upon detecting confusion, the access terminal 102 also may inform the access point 104 of the confusion and/or of the unique identifier.

In some implementations the access point 104 includes a confusion controller 118 that may detect actual or potential confusion between nodes in the system 100. For example, the confusion controller 118 may autonomously detect confusion or, upon receipt of an indication of confusion from the access terminal 102, the confusion controller 118 may take further steps to determine whether there is confusion. In the event confusion is detected, the access point 104 may request the access terminal 102 to acquire the unique identifier.

Once the confusion is resolved as discussed above, the access point 104 (e.g., a handover controller 120) may initiate handover operations based on the unique identifier. In this way, the access terminal 102 may be efficiently handed over to the desired target access point. As will be described below, in some implementations, the access terminal 102 (e.g., by operation of a handover controller, not shown) may initiate handover operations based on the unique identifier (e.g., once it resolves confusion).

The confusion described above may occur in a network 200 as shown in FIG. 2 where some access points provide macro coverage and other access points provide smaller coverage. Here, macro coverage areas 204 may be provided by, for example, macro access points of a large area cellular network such as a 3G network, typically referred to as a macro cell network or a wide area network ("WAN"). In addition, smaller coverage areas 206 may be provided by, for example, access points of a residence-based or building-based network environment, typically referred to as a local area network ("LAN"). As an access terminal ("AT") moves through such a network, the access terminal may be served in certain locations by access points that provide macro coverage while the access terminal may be served at other locations by access points that provide smaller area coverage. In some aspects, the smaller area coverage access points may be used to provide incremental capacity growth, in-building coverage, and different services, all leading to a more robust user experience.

In the description herein, a node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

Figure 2:
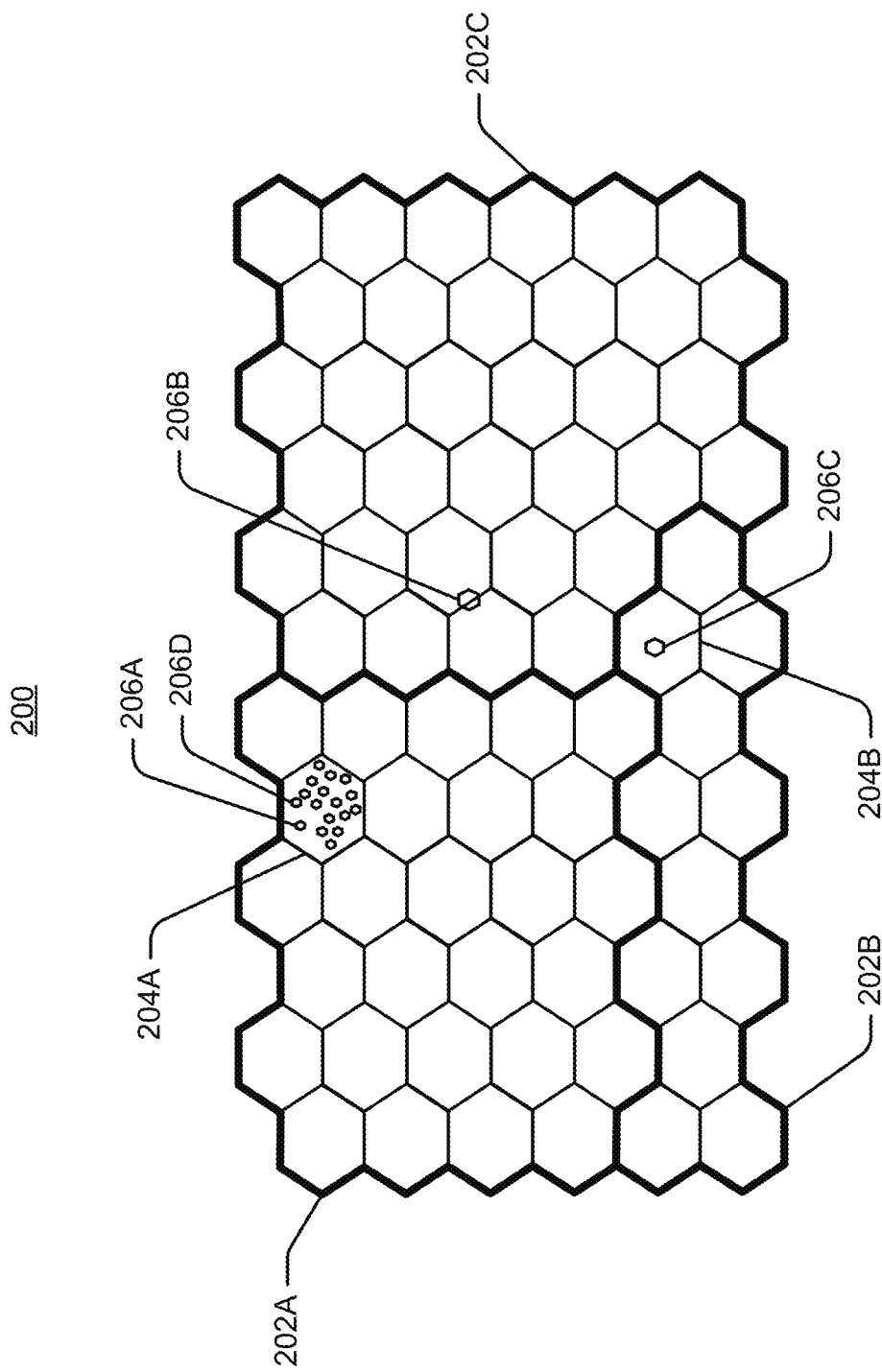
FIG. 2 is a simplified diagram illustrating coverage areas for wireless communication.

In the example of FIG. 2, several tracking areas 202 (or routing areas or location areas) are defined, each of which includes several macro coverage areas 204. Here, areas of coverage associated with tracking areas 202A, 202B, and 202C are delineated by the wide lines and the macro coverage areas 204 are represented by the hexagons. As mentioned above, the tracking areas 202 also may include femto coverage areas 206. In this example, each of the femto coverage areas 206 (e.g., femto coverage area 206C) is depicted within one or more macro coverage areas 204 (e.g., macro coverage area 204B). It should be appreciated, however, that a femto coverage area 206 may not lie entirely within a macro coverage area 204. Also, one or more pico or femto coverage areas (not shown) may be defined within a given tracking area 202 or macro coverage area 204.

In a deployment (e.g., a dense urban deployment) where a large number of access points such as femto and pico nodes are located within a given area, two or more of these access points may be assigned the same node identifier. For example, in the macro coverage area 204A, the femto coverage areas 206A and 206D may be assigned the same identifier. In such a case, node identifier confusion (e.g., PCID confusion) may occur since multiple neighboring nodes that are in the vicinity of the serving access point of an access terminal advertise the same node identifier. For example, in FIG. 1 the access points 106 and 110 may comprise femto nodes or pico nodes that advertise "identifier 1" via respective broadcast pilot signals. Moreover, both of these access points may be near the access point 104 (e.g., a macro access point) that is currently serving the access terminal 102. In such a case, the access point 104 may be aware of both access points 106 and 110 and, hence, confusion may arise when a handover to the access point identified by "identifier 1" is indicated.

In general, the confusion resolution techniques described herein may be applicable to any type of node. In many deployments, however, the macro access points in a given area will be planned such that there will not be confusion associated with a handover to a macro access point. In such cases, the confusion resolution techniques taught herein may be applicable to any non-macro nodes in the network. Such non-macro nodes may include, for example, nodes that are deployed in an unplanned manner. As noted above, such non-macro nodes may include femto nodes (e.g., deployed by individuals) as well as operator-deployed, low-power pico nodes. Also, as will be discussed in more detail below, a node may be restricted in some manner (e.g., restricted for access). Hence, the confusion resolution techniques taught herein may be applicable to restricted nodes (e.g., nodes associated with a closed subscriber group).

With the above overview in mind, various techniques that may be employed to resolve confusion in accordance with the teachings herein will be described with reference to FIGS. 3-13. Briefly, FIG. 3 illustrates several components that may be employed in an access point or access terminal and the flowcharts of FIGS. 4-13 relates to various techniques for resolving confusion.

Figure 3:
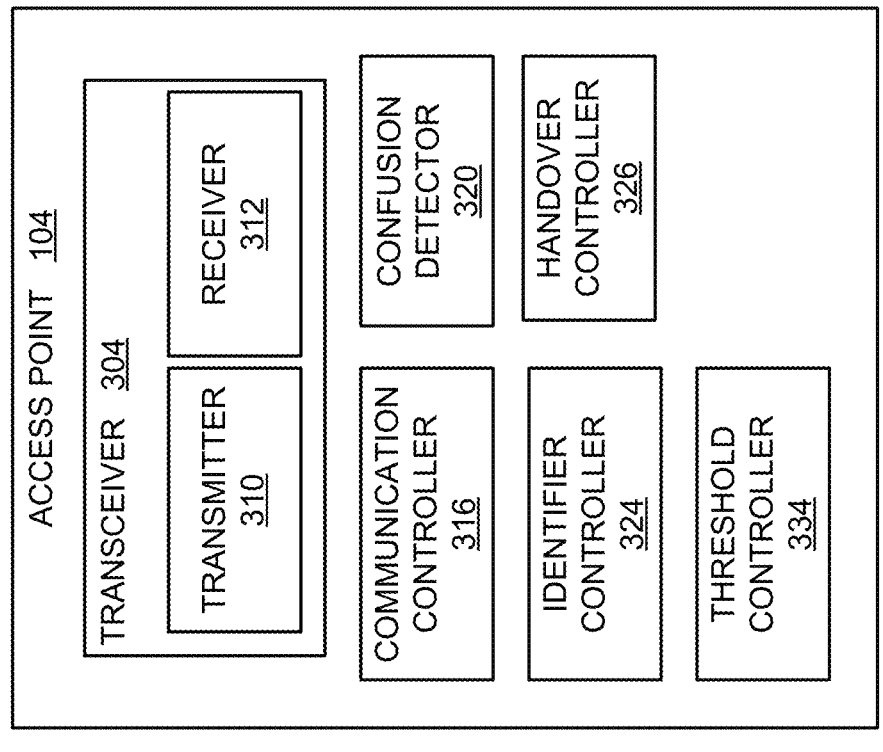
FIG. 3 is a flowchart of several sample aspects of operations that may be performed to specify use of a second type of identifier.
Figure 3:
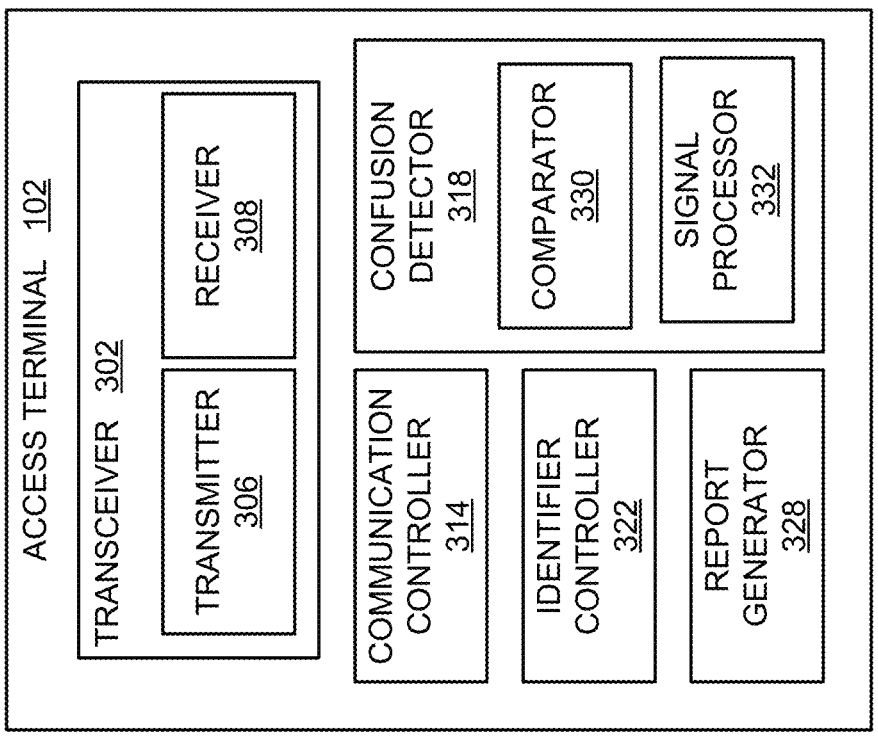

For illustration purposes, the operations of FIGS. 4-13 (or any other operations discussed or taught herein) may be described as being performed by specific components (e.g., components of the system 100 and/or the components shown in FIG. 3). It should be appreciated, however, that these operations may be performed by other types of components and may be performed using a different number of components. It also should be appreciated that one or more of the operations described herein may not be employed in a given implementation.

FIG. 3 illustrates several sample components that may be incorporated into nodes such as the access terminal 102 and the access point 104 to perform confusion resolution operations as taught herein. The described components also may be incorporated into other nodes in a communication system. For example, other nodes in a system may include components similar to those described for the access terminal 102 and the access point 104 to provide similar functionality. A given node may contain one or more of the described components. For example, an access terminal may contain multiple transceiver components that enable the access terminal to operate on multiple frequencies and/or communicate via different technology.

As shown in FIG. 3, the access terminal 102 and the access point 104 may include transceivers 302 and 304, respectively, for communicating with other nodes. The transceiver 302 includes a transmitter 306 for sending signals (e.g., messages) and a receiver 308 for receiving signals (e.g., including conducting searches for pilot signals). The transceiver 304 includes a transmitter 310 for sending signals and a receiver 312 for receiving signals.

The access terminal 102 and the access point 104 also include other components that may be used in conjunction with confusion resolution operations as taught herein. For example, the access terminal 102 and the access point may include communication controllers 314 and 316, respectively, for managing communication with other nodes (e.g., sending and receiving messages/indications) and for providing other related functionality as taught herein. The access terminal 102 and/or the access point 104 may include confusion detectors 318 and 320, respectively, for detecting confusion and for providing other related functionality as taught herein. The access terminal 102 and/or the access point 104 may include identifier controllers 322 and 324, respectively, for managing (e.g., selecting, acquiring, requesting, and so on) node identifiers and for providing other related functionality as taught herein. Sample operations of the other components of FIG. 3 are described below.

For convenience the access point 102 and the access terminal 104 are shown in FIG. 3 as including components that may be used in the various examples described below in conjunction with FIGS. 4-13. In practice, one or more of the illustrated components may not be used in a given example. As an example, in some implementations the access terminal 102 may not comprise the confusion detector 318 and in some implementation the access point 104 may not include the confusion detector 320.

Figure 4:
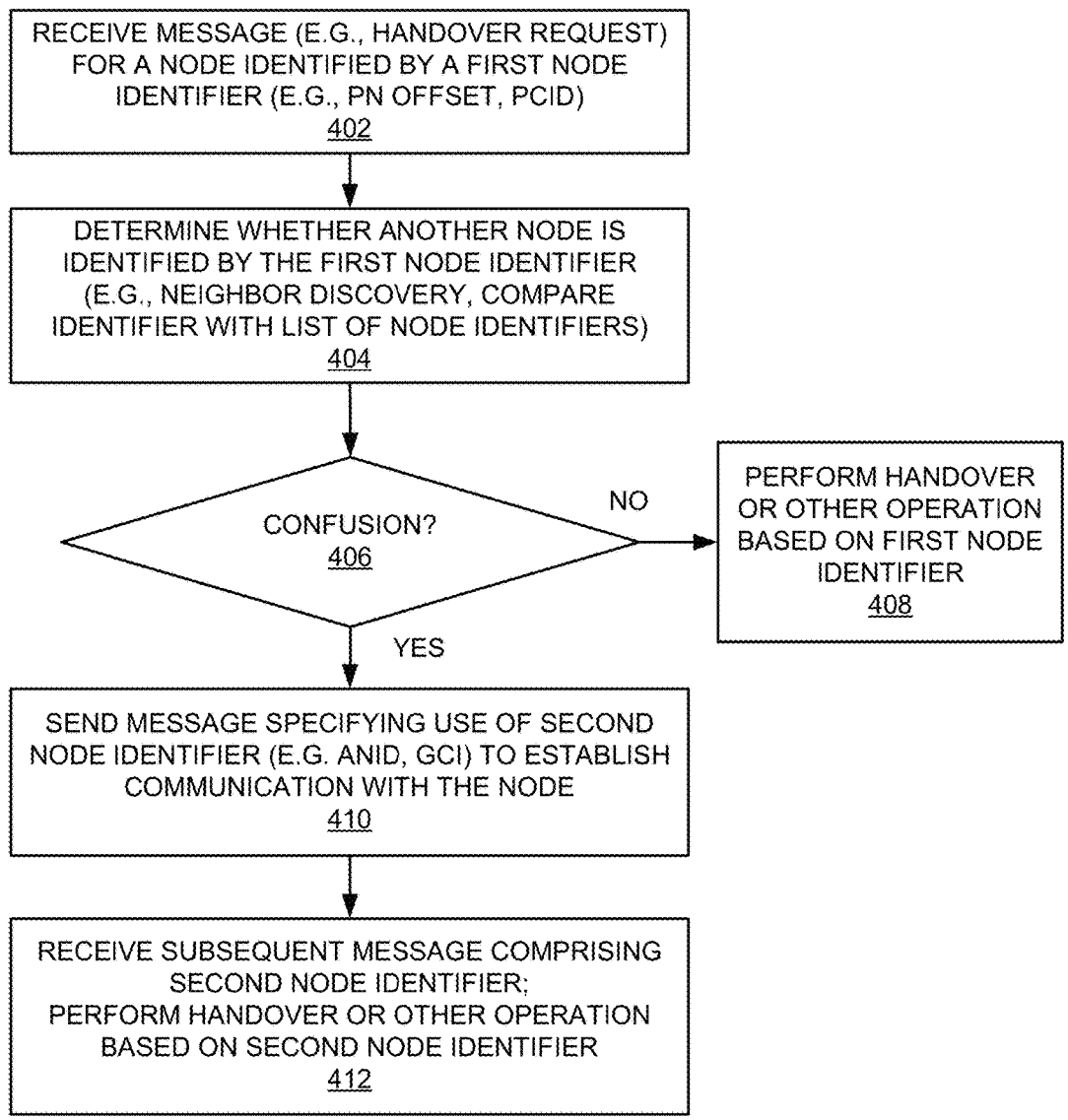
FIG. 4 is a simplified block diagram of several sample aspects of components that may be employed in communication nodes.
Figure 5:
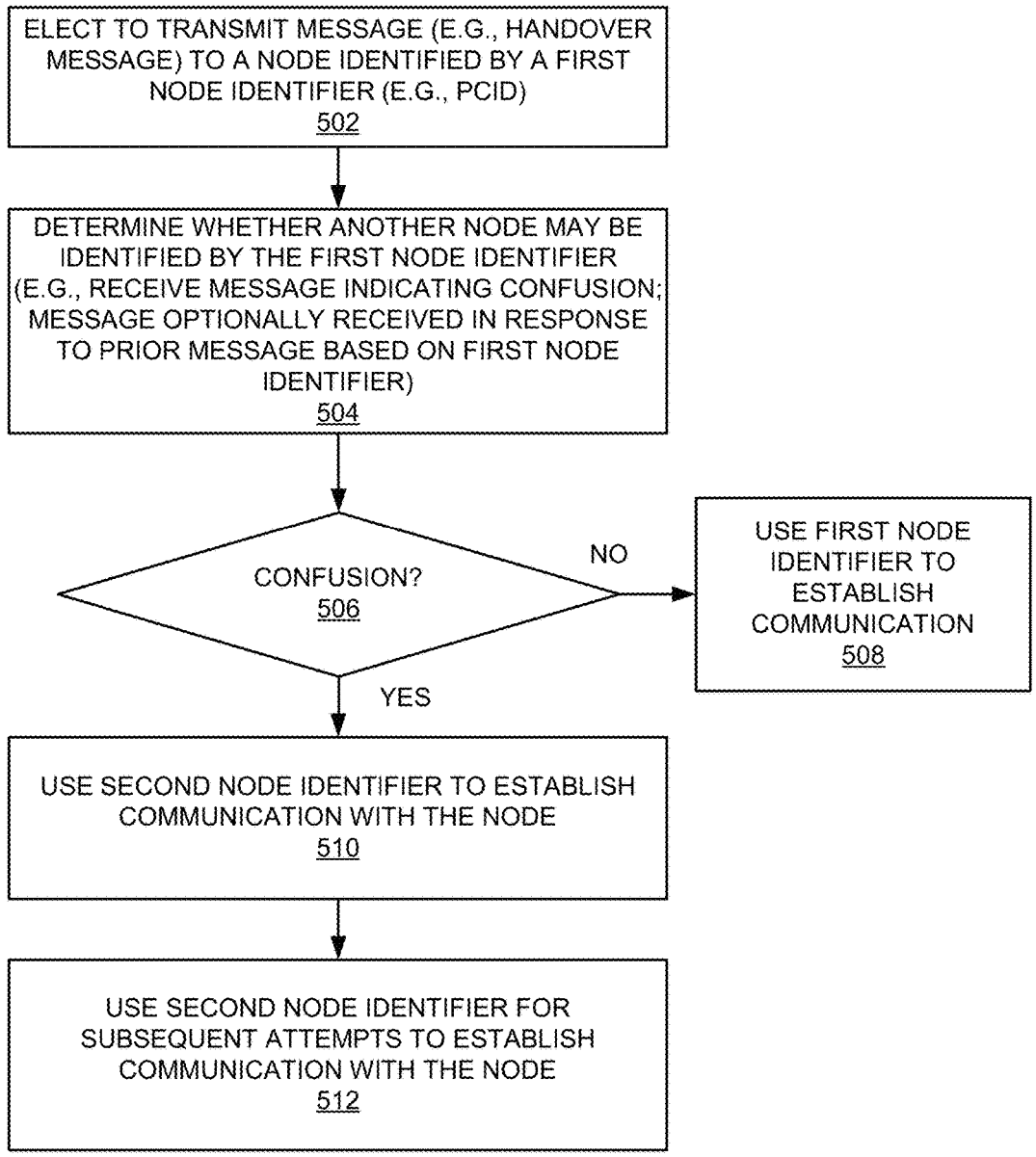
FIG. 5 is a flowchart of several sample aspects of operations that may be performed to determine whether to use a second type of identifier to communicate with a node.

Referring now to FIGS. 4 and 5, in some aspects confusion associated with a first type of identifier (e.g., a PN offset, a PCID, etc.) may be resolved by specifying the use of a second type of identifier (e.g., an ANID, a GCI, etc.) in conjunction with a handover or other operation.

This scheme may be employed, for example, when an access terminal that is connected to a macro access point activates a search for nearby femto nodes (e.g., a home femto node). When the access terminal detects a signal from a femto node, the access terminal may obtain an identifier of the first type (e.g., a Pilot ID, a sector ID, PCID etc.) from the signal. If the received signal strength is above a threshold value and/or the access terminal is authorized to access the discovered femto node (e.g., the access point is listed in a preferred roaming list of the access terminal), the access terminal may add this access point to the active set for the access terminal.

The first access terminal to do a route open for this femto node from the macro access point will establish a mapping between the identifier of the first type to the identifier of the second type (e.g., an ANID, GCI, etc.) at the macro access point. Here, upon receiving the second type of identifier from the access terminal, the macro access point may commence neighbor discovery with that femto node.

The presence of subsequent femto nodes with the same identifier of the first type in the macro coverage will result in the macro access point determining that there are multiple access points using a common identifier of the first type (i.e., detecting confusion with respect to this identifier). Here, the macro access point may discover the presence of these other femto nodes from, for example, neighbor discovery or by receiving a message from an access terminal that has discovered the confusion. The macro access point may then always request a second type of identifier whenever it receives a message (e.g., a route open) including the identifier subject to confusion. Upon receiving the second type of identifier from an access terminal, the macro access point may commence neighbor discovery with that femto node.

In addition, as an optimization in some implementations, the access terminal may send messages with the second type of identifier by default. For example, the access terminal may always use the second type of identifier when sending a route open or other message for its home femto node.

Referring initially to FIG. 4, as represented by block 402, an access point (e.g., access point 104) receives a message from an access terminal wherein the message is directed to a node (e.g., a target node such as access point 110) identified by a first node identifier. For example, as discussed above the access terminal may receive a route open request including a PN offset or some other type a message including some other type of identifier. It should be appreciated that such a message may take various forms. For example, in various implementations the message may comprise a message to set up resources for a handover, a handover request, an active set add request, interference management signaling, a signal strength measurement report, or a message for reserving at least one resource.

As represented by block 404, the access point determines whether another node is identified by the first node identifier. The access point may detect such confusion in various ways. For example, as discussed above the access point may receive messages from one or more access terminals that indicate the identifiers used by neighboring nodes. In some cases the access point may conduct neighbor discovery and determine that two or more neighboring nodes are using an identical identifier. In some cases the access point may receive configuration information (e.g., from a configuration manager as represented by the node 112 in FIG. 1) that indicates which identifiers are being used by the access point's neighbors. In some cases the operation of block 404 may comprise determining whether the identifier is a list of identifiers maintained by the access point. As discussed herein, this list of identifiers may comprise, for example, identifiers that are not guaranteed to be confusion free, identifiers that are potentially subject to confusion, or identifiers that have been determined to be subject to confusion. In some aspects, the list of identifiers may comprise a range of identifier values.

As represented by block 406 and 408, if confusion is not detected, the access point may perform the appropriate operation (e.g., a handover operation) based on the first node identifier.

As represented by block 410, if confusion is detected the access point sends a message to the access terminal that specifies that the access terminal is to use the second node identifier (e.g., an ANID) to establish communication with the node. Such a message may take various forms. For example, the message may comprise a rejection message (e.g., a route open reject) that instructs the access terminal to use a different identifier.

As represented by block 412, the access point may then receive a message from the access terminal that includes the second node identifier. The access point may perform the appropriate operation (e.g., a handover operation) based on the second node identifier. In some implementations this may involve tunneling the message including the second node identifier to the target node.

In some aspects the operations of FIG. 4 relate to reserving resources over a backhaul for a handover operation (e.g., in conjunction with an active set add operation). In addition, as the nodes subject to confusion may be restricted in some aspects (e.g., restricted for association or in some other way as discussed below), these operations also may relate to reserving resources for restricted nodes.

FIG. 5 relates in some aspects to specifying the use of a non-confusing identifier to establish communication with a node. In some aspects these operations may be complementary to some of the operations of FIG. 4.

As represented by block 502, an access terminal (e.g., access terminal 102) elects to transmit a message to a target node identified by a first node identifier. As mentioned above in block 402, this message may be sent via an associated access point (e.g., access point 104).

As represented by block 504, the access terminal determines whether another node may be identified by the first node identifier. This determination may be made in various ways. As discussed above, the access terminal may have sent a message to the access point 104 using the first node identifier and received a message from the access point 104 that indicates there is confusion (and that specifies the use of a second node identifier). In some cases this determination may involve attempting to communicate with the target node and receiving a message from a target node that indicates that communication is not authorized. Such a rejection message may be received because the context for the access terminal was sent to a node other than the intended target node due to node identifier confusion. Also, the access terminal may identify confusion based on signals it receives from neighboring access points that indicate the identifiers used by those access points.

As represented by blocks 506 and 508, if confusion is not detected, the access terminal may use the first node identifier to establish communication with the target node.

As represented by block 510, if confusion is detected the access terminal may use the second node identifier to establish communication with the target node.

Moreover, as represented by block 512, the access terminal may be configured to use the second node identifier to establish communication with the target node. For example, the access terminal may be configured in this way after the access terminal detects confusion. Alternatively, as discussed herein the access terminal may send a second node identifier by default.

Figure 6:
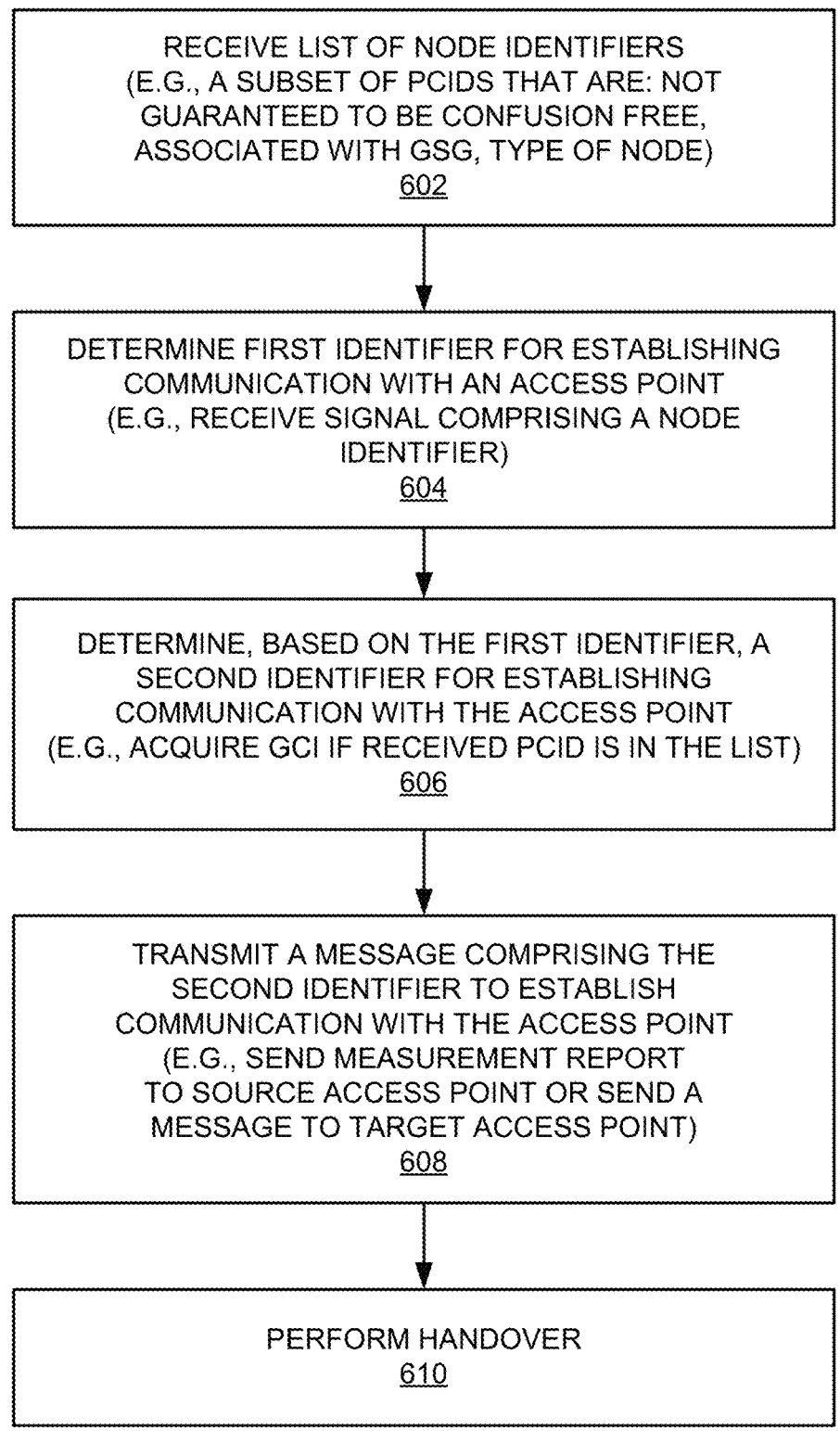
FIG. 6 is a flowchart of several sample aspects of operations that may be performed to determine whether to use a second type of identifier to communicate with a node based on a list of identifiers.

FIG. 6 relates in some aspects to reserving a subset of the node identifier space (e.g., PCID space) for non-macro nodes to simplify confusion resolution. In this way, a node that receives an identifier from the subset may readily determine that confusion is possible or likely. In some implementations the subset comprises a set of designated values that is associated with access points that are designated as not being confusion-free. In some implementations the subset comprises a set of designated values that is associated with a closed subscriber group (e.g., as discussed below). In some implementations the subset comprises a set of designated values that is associated with access points of at least one designated type (e.g., a node type). Such a designated type may relate to, for example, one or more of: transmit power, coverage area, or relay capabilities.

As represented by block 602, an access terminal (e.g., access terminal 102) receives a list of node identifiers. This list may comprise, for example, the subset of node identifiers discussed above. In some implementations this list may be received from a serving access point (e.g., access point 104) that advertises the list. In some implementations a target access point or some other access points (e.g., via neighbor list information) may advertise an indication that a second type of identifier (e.g., a GCI) is to be used when accessing the target access point. In some implementations this list may be received from a configuration manager (e.g., network node 112) that keeps track of the reserved set of nodes that are assigned an identifier from the list.

As represented by block 604, the access terminal determines a first identifier for communicating with the target access point. For example, as discussed herein such an identifier may be received via a pilot signal or some other suitable signal.

As represented by block 606, the access terminal may determine (e.g., autonomously) whether to use a second identifier (e.g., a GCI) for establishing communication with the access point. In some aspects this determination may be based on the first identifier (e.g., by determining the type of the first identifier). For example, if the identifier obtained at block 604 is on the list obtained at block 602, the access terminal may acquire the second identifier. Here, acquiring the second identifier may comprise monitoring for other signals (from the target access point) that contain the second identifier. As an example, the target access point may broadcast the second identifier at intervals that are less frequent than the intervals at which the target access point broadcasts a first identifier.

As represented by block 608, the access terminal may transmit a message comprising the second identifier to establish communication with the target access point. This message may take various forms in various scenarios. For example, the message may comprise a signal strength measurement message, a radio resource report, or a handover request. In a typical implementation the access terminal (e.g., access terminal 102) includes the associated PCID and GCI values in a measurement report the access terminal sends to its serving access point (e.g., access point 104). In addition, as described below in conjunction with FIG. 7, under certain circumstances the access terminal may send this information to the target access point.

As represented by block 610, upon receipt of this information, the serving access point may initiate a handover procedure using the GCI value. Accordingly, the serving access point will set up the resources at the target cell and send a handover command to the access terminal.

Figure 7:
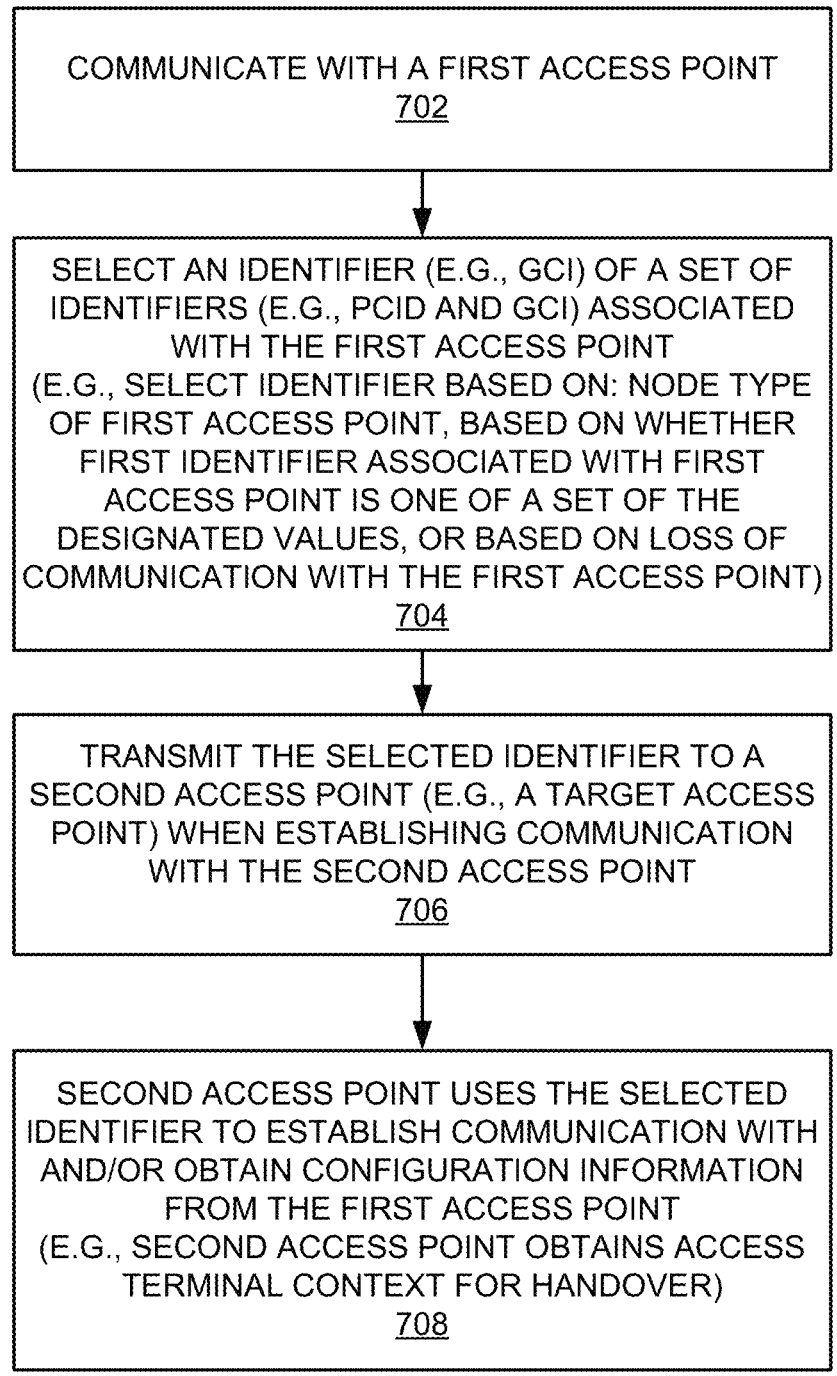
FIG. 7 is a flowchart of several sample aspects of operations that may be performed to resolve confusion for a source node.

FIG. 7 relates in some aspects to selecting an identifier to be provided to a target access point wherein the identifier is associated with a source access point. For example, the access terminal may use the GCI of the source access point in cases where the access terminal accesses the target access point directly, without prior handover preparation. In this case, the access terminal may include the GCI of the source access point while accessing the target access point. This allows the target access point to resolve any confusion about the identity of the source access point. The target access points may then fetch the context for the access terminal from the appropriate source access point, and complete the handover. These operations are described in blocks 702-706 of FIG. 7.

As represented by block 702, the access terminal selects identifier (e.g., a GCI) of a set of identifiers (e.g., a first identifier such as PCID and a second identifier such as GCI) associated with a source access point (e.g., access point 104). In some aspects, selection of the second identifier may be based on whether the first identifier is in a received list of identifiers (e.g., designated as non-confusion free, based on node type of an access point, etc.) in a similar manner as discussed above in conjunction with FIG. 6. As mentioned above, in some aspects selection of the second identifier may be based on a loss of communication with a source access point (e.g., access point 104).

As represented by block 706, the access terminal transmits the selected identifier to the target access point when establishing communication with the target access point. For example, the access terminal may include the GCI of the source access point in a connection request message.

As represented by block 702, the access terminal selects identifier (e.g., a GCI) of a set of identifiers (e.g., a first identifier such as PCID and a second identifier such as GCI) associated with a source access point (e.g., access point 104). In some aspects, selection of the second identifier may be based on whether the first identifier is in a received list of identifiers (e.g., designated as non-confusion free, based on node type of an access point, etc.) in a similar manner as discussed above in conjunction with FIG. 6. As mentioned above, in some aspects selection of the second identifier may be based on a loss of communication with a source access point (e.g., access point 104).

Figure 8:
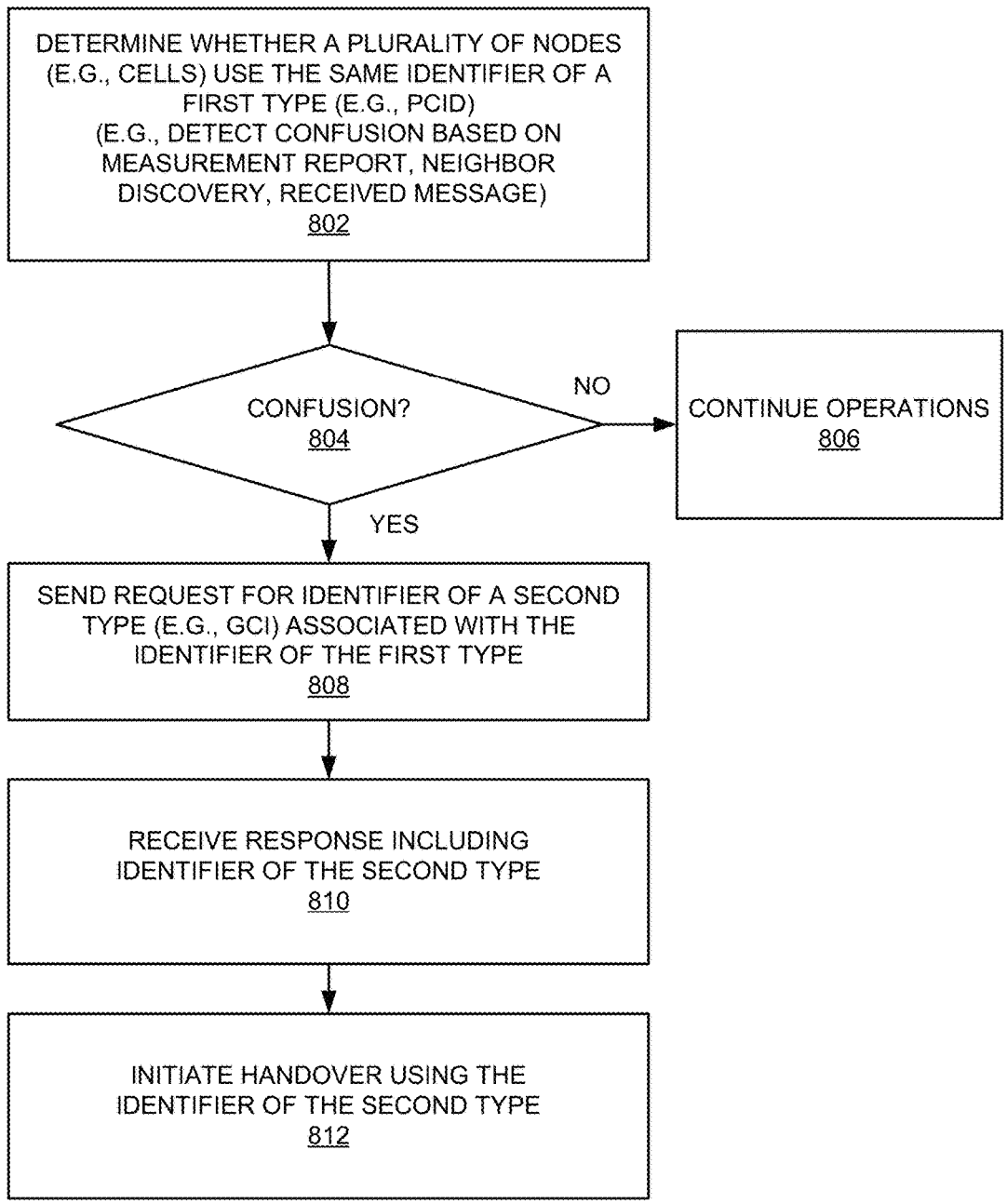
FIG. 8 is a flowchart of several sample aspects of operations that may be performed to determine whether to request acquisition of a second type of identifier.

FIG. 8 relates in some aspects to operations an access point and/or an access terminal may perform in conjunction with detecting and resolving node identifier confusion. In some aspects, these operations are complementary to the operations described above in conjunction with FIG. 5.

As represented by block 706, the target access point may then use the selected identifier to establish communication with and/or obtain configuration information from the source access point. In this way, the target access point may obtain context information for the access terminal to complete handover.

As represented by blocks 804 and 806, if confusion is not detected the access point may continue with normal operations. For example, the access point may determine whether to perform a handover based on an identifier of the first type received via a measurement report.

As represented by block 808, if confusion is detected the access point may issue a request to obtain an identifier of the second type that is associated with the identifier of the first type subject to confusion. For example, if a PCID subject to confusion was received via a measurement report from an access terminal (e.g., access terminal 102), the access point may send a request to the access terminal to acquire the GCI associated with the PCID. The access terminal may then acquire the GCI, for example, as discussed herein.

As represented by block 810, the access point may then receive a response from the access terminal that includes the GCI. As the confusion will now be resolved (e.g., at the access point), at block 812 the handover operation may be initiated (e.g., by the access point) using the received GCI.

Figure 9A:
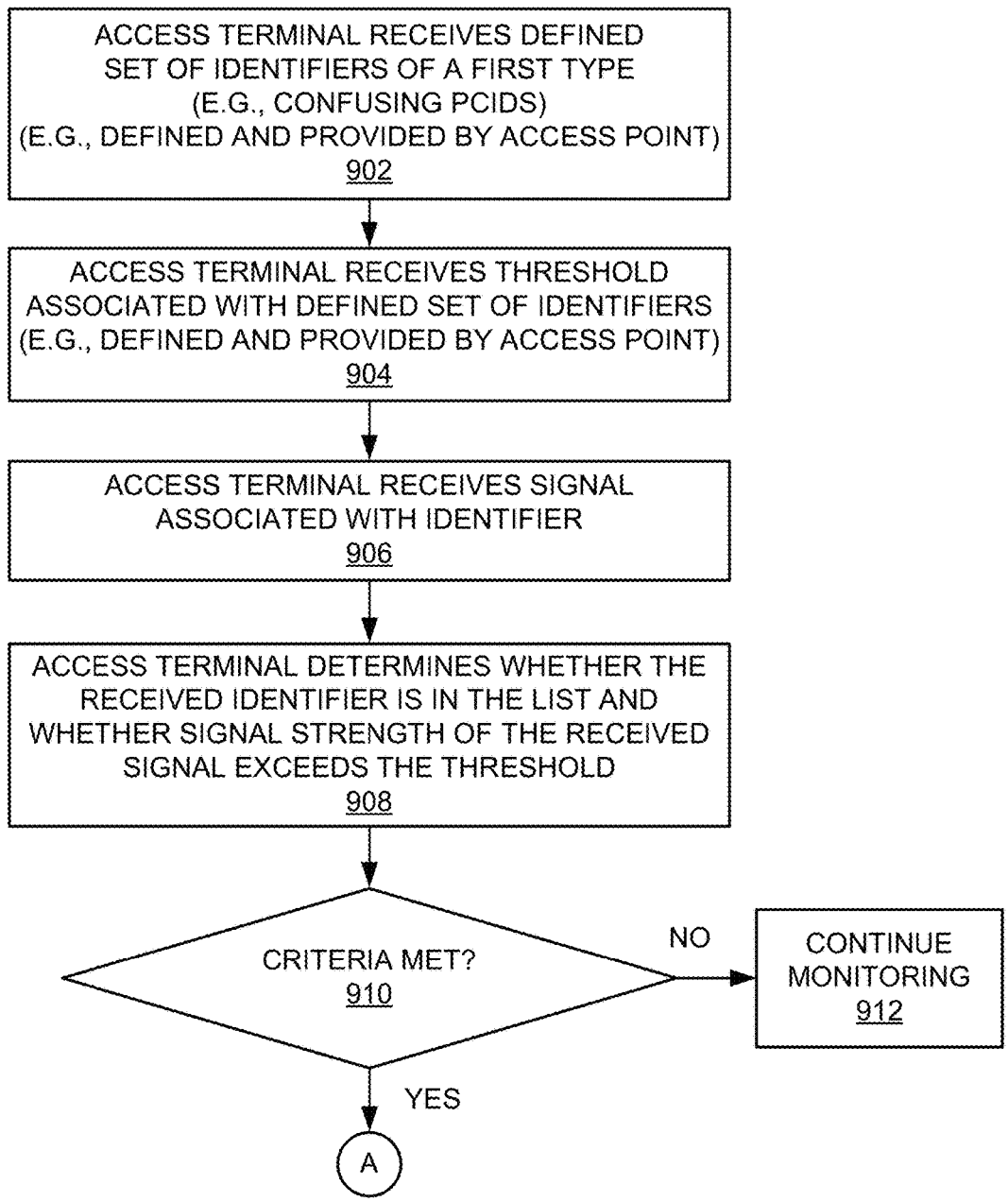
FIGS. 9A and 9B are a flowchart of several sample aspects of operations that may be performed to trigger an access terminal to acquire a second type of identifier.
Figure 9B:
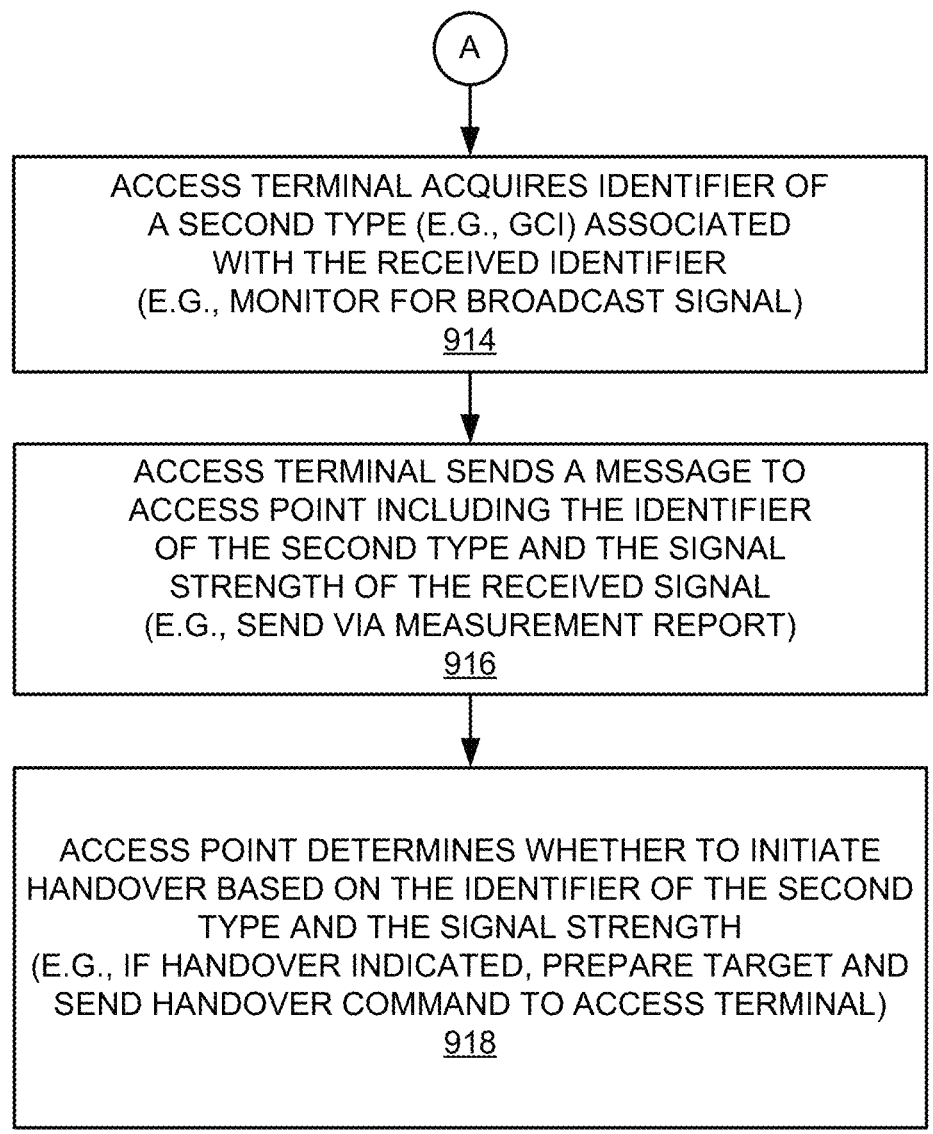

FIGS. 9A and 9B relate in some aspects to the use of a threshold for triggering acquisition of a unique identifier (e.g., GCI). In some cases, an access terminal may autonomously determine when to acquire the unique identifier; that is, without being instructed to do so by another node (e.g., an access point).

As represented by block 902, an access terminal may receive a defined set of identifiers of a first type (e.g., the list of node identifiers described above). In some implementations this information may be defined by and/or provided by a serving access point (e.g., by the identifier controller 324) or some other node. For example, the serving access point may identify all of the PCID identifiers that are or may be subject to confusion, and supply a list of these identifiers to the access terminal.

As represented by block 904, the access terminal also may receive a threshold associated with the defined set of identifiers. For example, this threshold may designate the threshold signal strength value for a received signal that triggers GCI acquisition by the access terminal. In some implementations this threshold may be defined by and/or provided by a serving access point (e.g., by a threshold controller 334) or some other node. For example, this threshold may be defined to be lower (e.g., by a few dB) than the received signal strength threshold that triggers a handover operation. In some implementations the threshold may be specified as a relative offset from a target access point signal strength, or as an absolute threshold for the carrier-to-interference ("C/I") value from a target access point.

As represented by block 906, at some point in time the access terminal will receive a signal that is associated with an identifier of the first type. As represented by block 908, the access terminal (e.g., a comparator 330) may determine whether the received identifier is in the list of identifiers. In addition, the access terminal (e.g., a signal processor 332, which may be implemented in or operate in conjunction with the receiver 308) determines whether the received signal strength of the signal received by block 906 is greater than equal to the threshold.

As represented by blocks 910 and 912, if the criteria of block 908 are not met, the access terminal may continue monitoring for signals from neighboring access points.

As represented by block 914, if the criteria of block 908 are met, the access terminal acquires an identifier the second type (e.g., GCI) that is associated with the identifier received at block 906. As discussed above, this may involve monitoring for a broadcast signal with a specific periodicity.

As represented by block 916, the access terminal (e.g., the report generator 328) sends a message to the access point including the identifier acquired at blocks 906 and 910 and the received signal strength of an associated signal (e.g., the signal received at block 906). This message may be sent just after the unique identifier is acquired at block 910 or at some other time. In some implementations this information is sent in a measurement report. For example, this report may be sent once the received signal strength of a received signal (e.g., from a target access point) exceeds a handover threshold.

As represented by block 918, as any confusion will now be resolved, the access point (e.g., the handover controller 326) determines whether to initiate a handover operation based on the identifier and the received signal strength provided in this message. As discussed herein, if a handover operation is indicated, the access point will use the unique identifier to prepare the target access point and send a handover command to the access terminal.

In some aspects the scheme of FIG. 9 may prove advantageous in high mobility environments. For example, this scheme may provide faster handover because the GCI may be read before the signal strength of the target access point is strong enough for handover to be required.

Figure 10A:
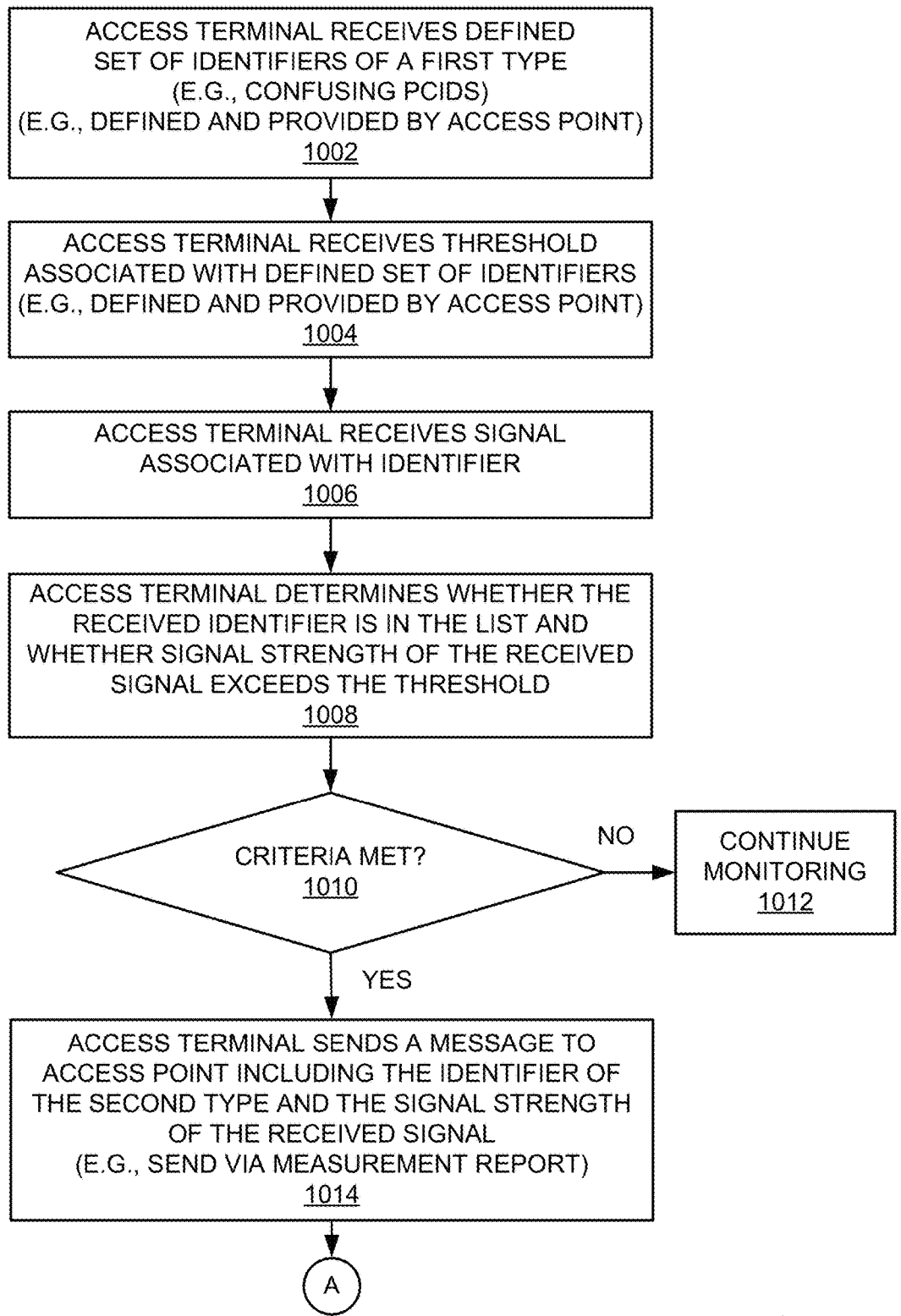
FIGS. 10A and 10B are a flowchart of several sample aspects of operations that may be performed to trigger an access terminal to acquire a second type of identifier.
Figure 10B:
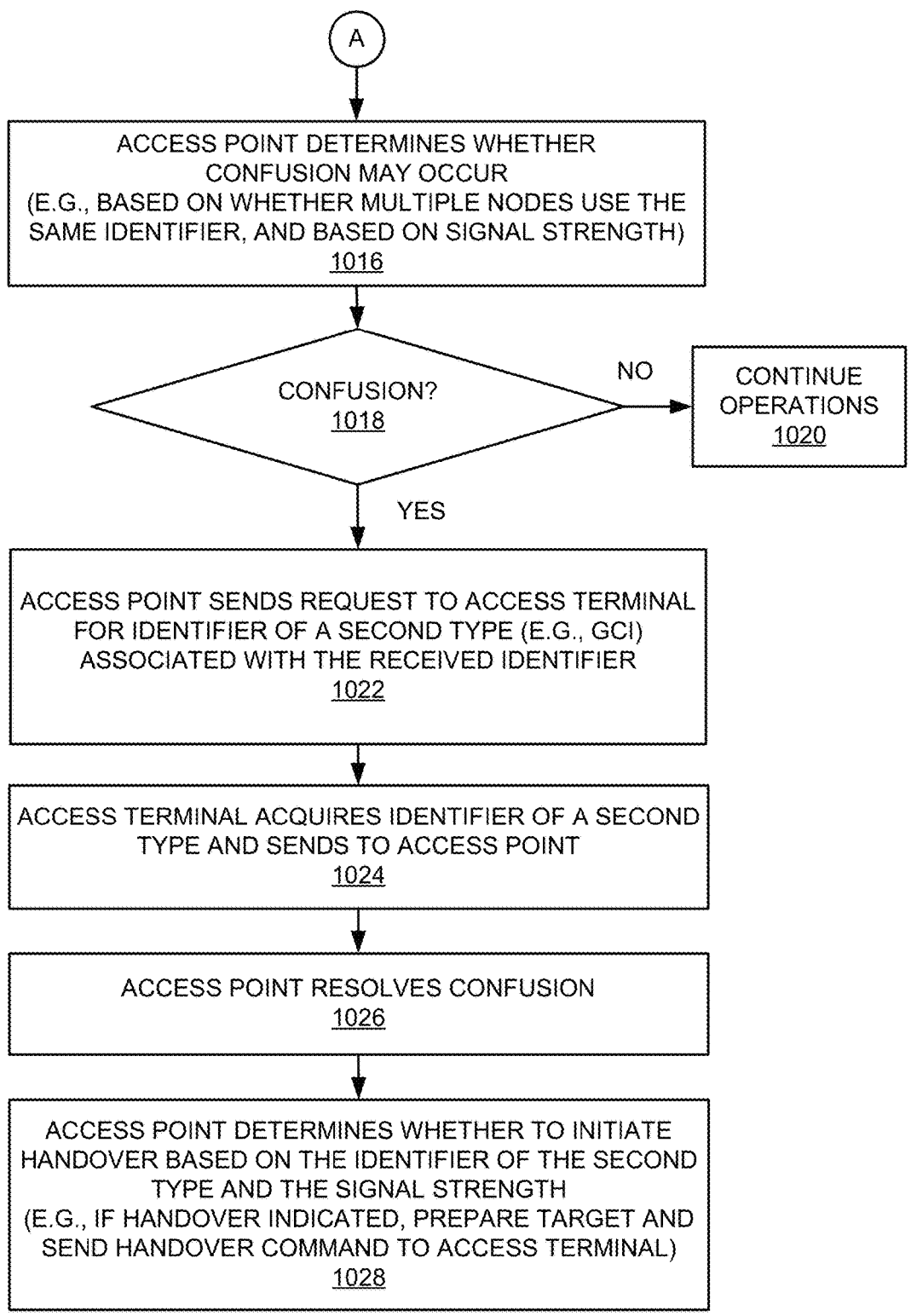

FIGS. 10A and 10B relate in some aspects to a scheme where an access terminal reports receipt of a signal that exceeded a threshold (e.g., GCI threshold) to an access point. In this case, the access point may determine whether confusion is possible and, if so, instruct the access terminal to acquire a unique identifier (e.g., GCI). Here, the operations of the blocks 1002-1012 may be similar to the operations of blocks 902-912, respectively.

At block 1014, however, if the criteria are met at block 1010 the access terminal sends a message to the access point that includes the identifier acquired at block 1006 and the received signal strength of the associated signal. This message may be sent just after the identifier is acquired at block 1006 or at some other time. In some implementations this information is sent in a measurement report.

As represented by block 1016, the access point determines whether confusion is likely based on the received information. For example, this determination may be based on whether multiple nodes use the same identifier. In addition, this determination may optionally be based on the received signal strength of any detected signals that include this identifier.

As represented by blocks 1018 and 1020, if confusion is not detected the access point may continue with normal operations. For example, the access point may determine whether to perform a handover based on an identifier of the first type received via a measurement report.

As represented by block 1022, if confusion is detected the access point sends a message to the access terminal that requested access terminal to acquire the unique identifier (e.g., CGI) associated with the identifier subject to confusion. As represented by block 1024, the access terminal may then acquire the identifier as discussed herein and send the identifier to the access point (e.g., via a measurement report).

As represented by blocks 1026 and 1028, the access point thereby resolves the confusion and determines whether to initiate a handover based on the unique identifier and the received signal strength (e.g., as discussed herein).

Figure 11:
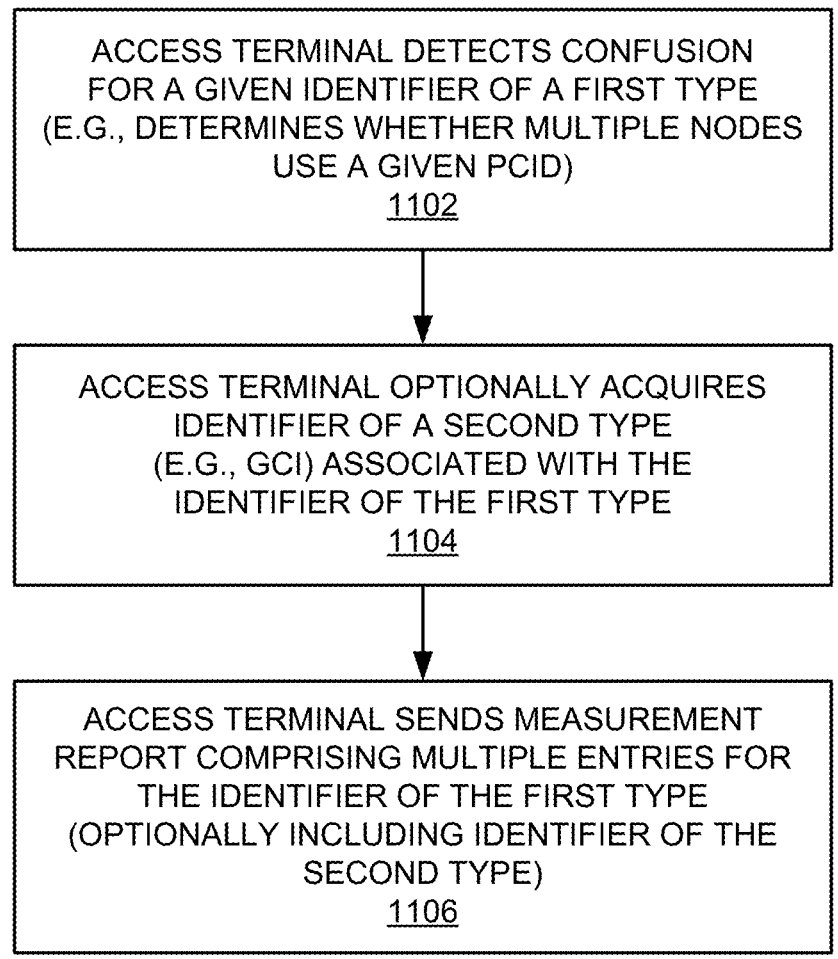
FIG. 11 is a flowchart of several sample aspects of operations that may be performed in conjunction with an access terminal detecting a confusion.

FIG. 11 relates in some aspects to collision detection (e.g., autonomous detection) by an access terminal. In particular, this scheme relates to an access terminal that provides a measurement report with collision information.

As represented by block 1102, an access terminal detects a collision for a given identifier of a first type. For example, based on the monitored pilot signals or other suitable signals, the access terminal may determine that multiple access points use the same PCID as discussed herein.

As represented by block 1104, the access terminal may optionally acquire an identifier the second type (e.g., GCI) associated with the identifier for which a collision has been indicated. Again, this operation may be performed as discussed above.

As represented by block 1106, the access terminal sends a measurement report that includes multiple entries for the identifier for which a collision has been indicated. For example, if two access terminals use a PCID value of 12, the measurement report may include two separate entries corresponding to a PCID value of 12. In addition, the measurement report may optionally include the unique identifier (e.g., GCI) associated with each of these entries.

Figure 12:
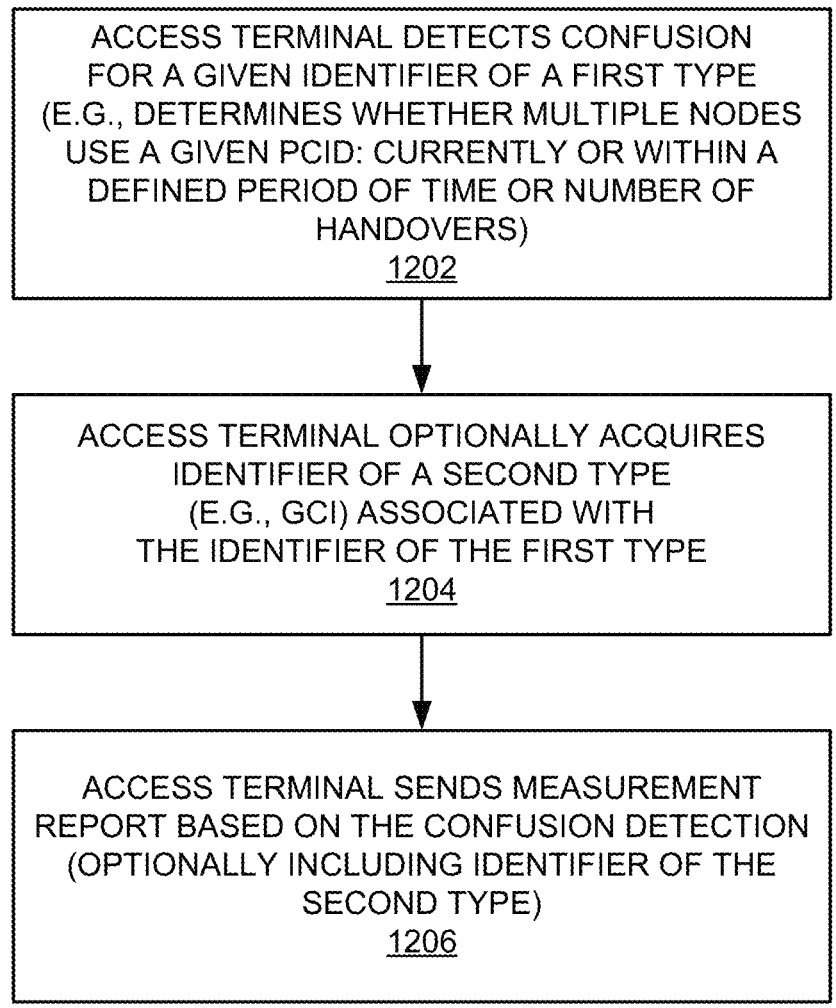
FIG. 12 is a flowchart of several sample aspects of operations that may be performed in conjunction with an access terminal detecting a confusion.

FIG. 12 relates in some aspects to autonomous collision detection by an access terminal. In particular, this scheme relates to an access terminal that sends a measurement report if it detects a collision.

As represented by block 1202, an access terminal detects a collision for a given identifier of a first type. As above, the access terminal may determine that multiple access points use the same PCID based on the monitored pilot signals or other suitable signals, as discussed herein.

In some aspects, detection of a collision may be indicated based on whether at least two nodes are currently using this same identifier or have recently used the same identifier. For example, a collision may be indicated if the access terminal is currently receiving synchronization or pilot signals from multiple access points that use the same PCID. In addition, a collision may be indicated if the access terminal received synchronization or pilot signals from multiple access points within a defined period of time (e.g., the last 10 seconds). Under certain conditions, this period of time may be set to zero (e.g., for a very fast-moving access terminal). Also, a collision may be indicated if the access terminal received synchronization or pilot signals from multiple access points over a period of time associated with a defined number of handovers (e.g., the last four handovers). This latter scheme may advantageously allow slow-moving access terminals sent reports to cover a desired geographical area. In other words, this scheme allows the detection of repeating node identifiers over a wider geographical area.

As represented by block 1204, the access terminal may optionally acquire an identifier the second type (e.g., GCI) associated with the identifier for which a collision has been indicated. Again, this operation may be performed as discussed above.

As represented by block 1206, the access terminal sends a measurement report if collision was detected at block 1202. In addition, the measurement report may optionally include the unique identifier (e.g., GCI) associated with each of these entries.

Figure 13:
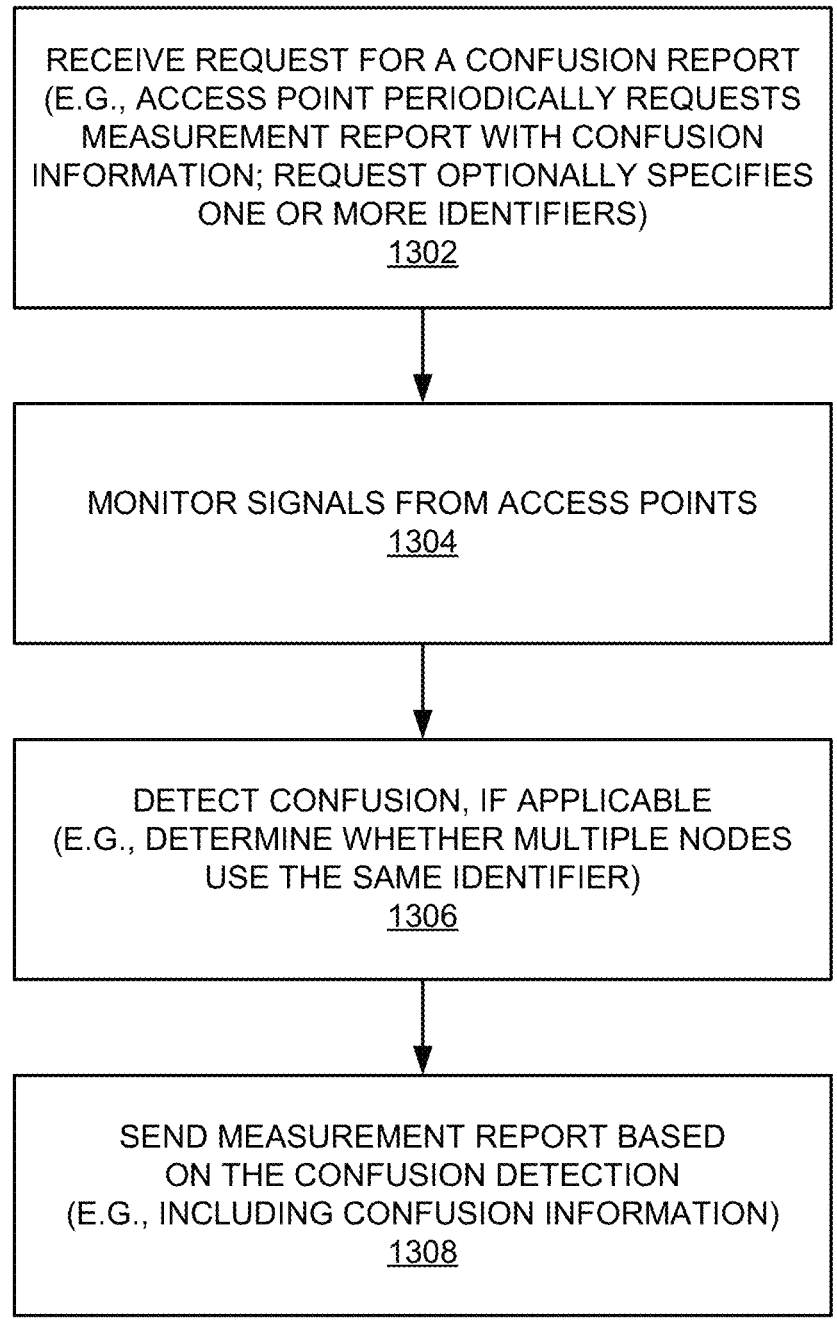
FIG. 13 is a flowchart of several sample aspects of operations that may be performed in conjunction with an access terminal providing a confusion report upon request.

FIG. 13 relates in some aspects access terminal that provides a collision report upon request. As represented by block 1302, the access terminal receives a request for a collision report. For example, the network may periodically request the access terminal to send a measurement report with collision information. This request may specify one or more identifiers (e.g., PCIDs) for which collision information is requested. This identifier may be the identifier of the requesting node (e.g., the serving access point). Alternately, this request may include a wildcard identifier, wherein the access terminal is requested to report all detected collisions. As represented by block 1304, the access terminal monitors for signals from neighboring access points and detects collisions if applicable (block 1306). As represented by block 1308, the access terminal sends a collision report if a collision was detected at block 1306. In the event the access terminal does not have any collision information, the access terminal may respond with a "no event" message or may not provide any response. It should be appreciated that one or more of the operations of FIGS. 11-13 may be combined in various ways in different implementations.

Figure 14:
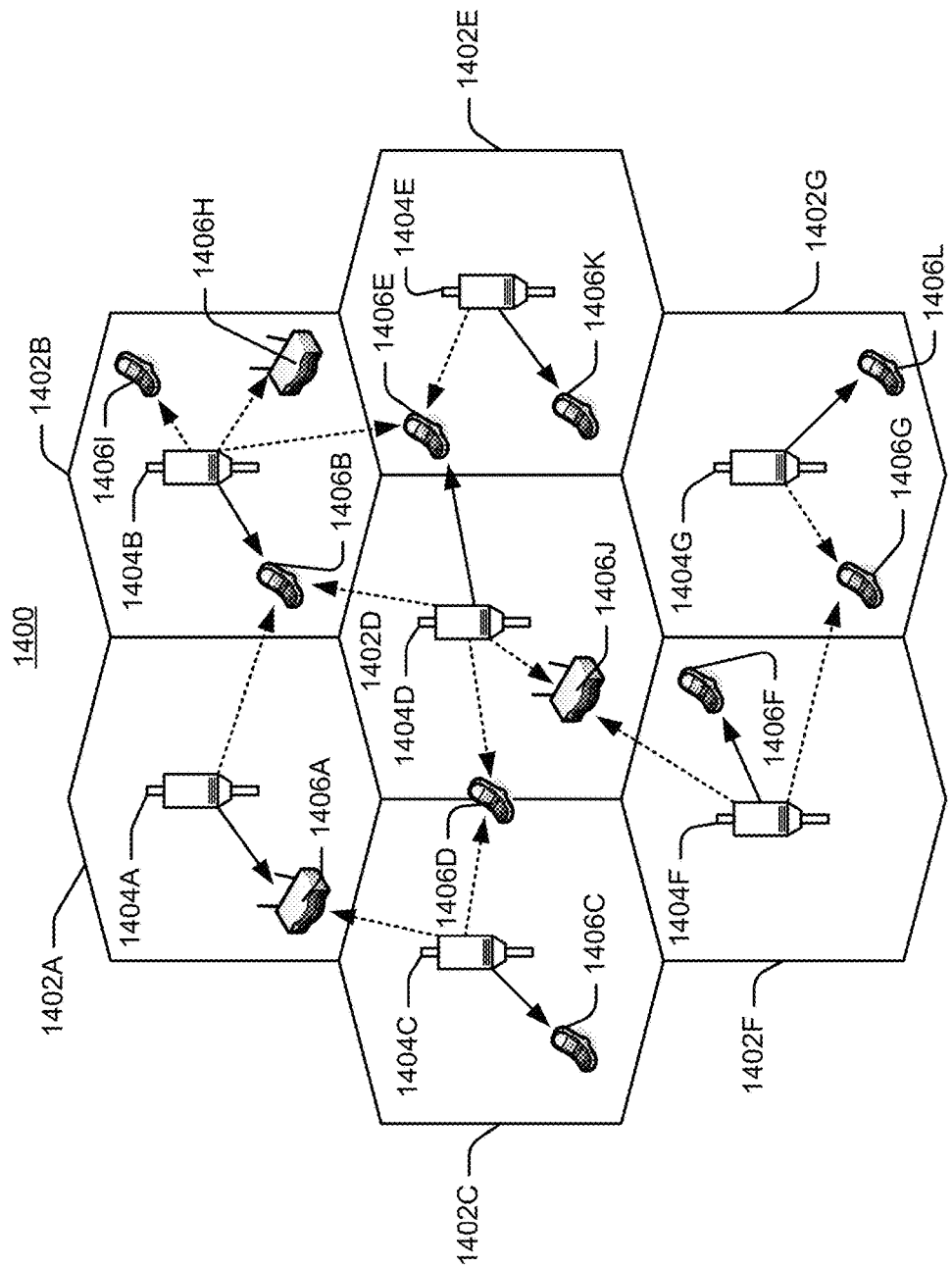
FIG. 14 is a simplified diagram of a wireless communication system.
Figure 15:
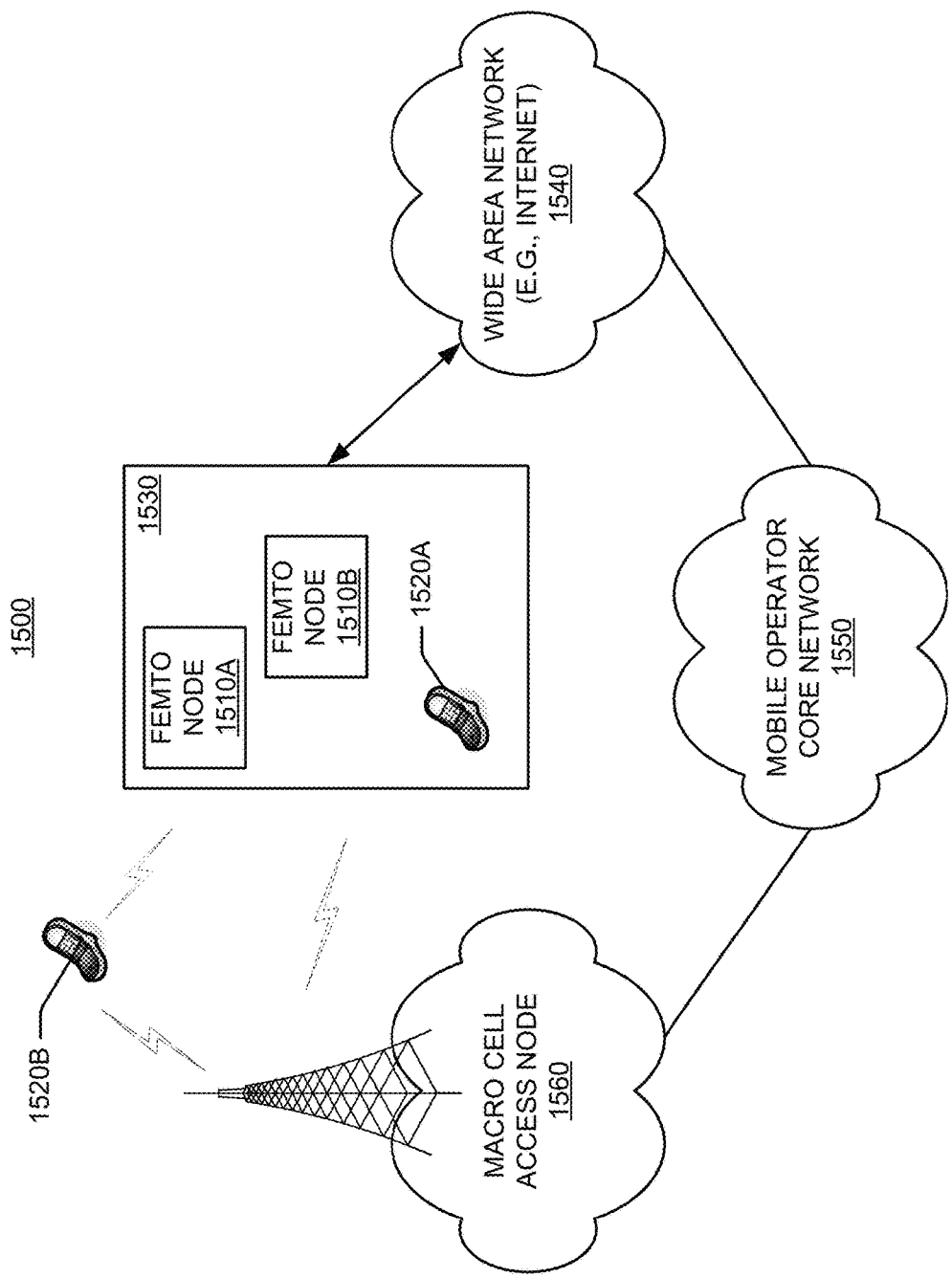
FIG. 15 is a simplified diagram of a wireless communication system including femto nodes.

As mentioned above, the teaching herein may be implemented in network that employs macro access points and femto nodes. FIGS. 14 and 15 illustrate examples how access points may be deployed in such a network. FIG. 14 illustrates, in a simplified manner, how the cells 1402 (e.g., macro cells 1402A-1402G) of a wireless communication system 1400 may serviced by corresponding access points 1404 (e.g., access points 1404A-1404G). Here, the macro cells 1402 may correspond to the macro coverage areas 204 of FIG. 2. As shown in FIG. 14, access terminals 1406 (e.g., access terminals 1406A-1406L) may be dispersed at various locations throughout the system over time. Each access terminal 1406 may communicate with one or more access points 1404 on a forward link ("FL") and/or a reverse link ("RL") at a given moment, depending upon whether the access terminal 1406 is active and whether it is in soft handover, for example. Through the use of this cellular scheme, the wireless communication system 1400 may provide service over a large geographic region. For example, each of the macro cells 1402A-1402G may cover a few blocks in a neighborhood or several square miles in rural environment.

FIG. 15 illustrates an example how one or more femto nodes may be deployed within a network environment (e.g., the system 1400). In the system 1500 of FIG. 15, multiple femto nodes 1510 (e.g., femto nodes 1510A and 1510B) are installed in a relatively small area coverage network environment (e.g., in one or more user residences 1530). Each femto node 1510 may be coupled to a wide area network 1540 (e.g., the Internet) and a mobile operator core network 1550 via a DSL router, a cable modem, a wireless link, or other connectivity means (not shown).

The owner of a femto node 1510 may subscribe to mobile service, such as, for example, 3G mobile service, offered through the mobile operator core network 1550. In addition, an access terminal 1520 may be capable of operating both in macro environments and in smaller area coverage (e.g., residential) network environments. In other words, depending on the current location of the access terminal 1520, the access terminal 1520 may be served by a macro cell access point 1560 associated with the mobile operator core network 1550 or by any one of a set of femto nodes 1510 (e.g., the femto nodes 1510A and 1510B that reside within a corresponding user residence 1530). For example, when a subscriber is outside his home, the subscriber may be served by a standard macro access point (e.g., access point 1560) and when the subscriber is near or inside his home, the subscriber may be served by a femto node (e.g., node 1510A). Here, a femto node 1510 may be backward compatible with legacy access terminals 1520.

A femto node 1510 may be deployed on a single frequency or, in the alternative, on multiple frequencies. Depending on the particular configuration, the single frequency or one or more of the multiple frequencies may overlap with one or more frequencies used by a macro access point (e.g., access point 1560).

In some aspects, an access terminal 1520 may be configured to connect to a preferred femto node (e.g., the home femto node of the access terminal 1520) whenever such connectivity is possible. For example, whenever the access terminal 1520A is within the user's residence 1530, it may be desired that the access terminal 1520A communicate only with the home femto node 1510A or 1510B.

In some aspects, if the access terminal 1520 operates within the macro cellular network 1550 but is not residing on its most preferred network (e.g., as defined in a preferred roaming list), the access terminal 1520 may continue to search for the most preferred network (e.g., the preferred femto node 1510) using a Better System Reselection ("BSR"), which may involve a periodic scanning of available systems to determine whether better systems are currently available, and subsequent efforts to associate with such preferred systems. With the acquisition entry, the access terminal 1520 may limit the search for specific band and channel. For example, the search for the most preferred system may be repeated periodically. Upon discovery of a preferred femto node 1510, the access terminal 1520 selects the femto node 1510 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1510 that reside within the corresponding user residence 1530). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

The teachings herein may be implemented in various types of communication devices. In some aspects, the teachings herein may be implemented in wireless devices that may be deployed in a multiple access communication system that may simultaneously support communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

Figure 16:
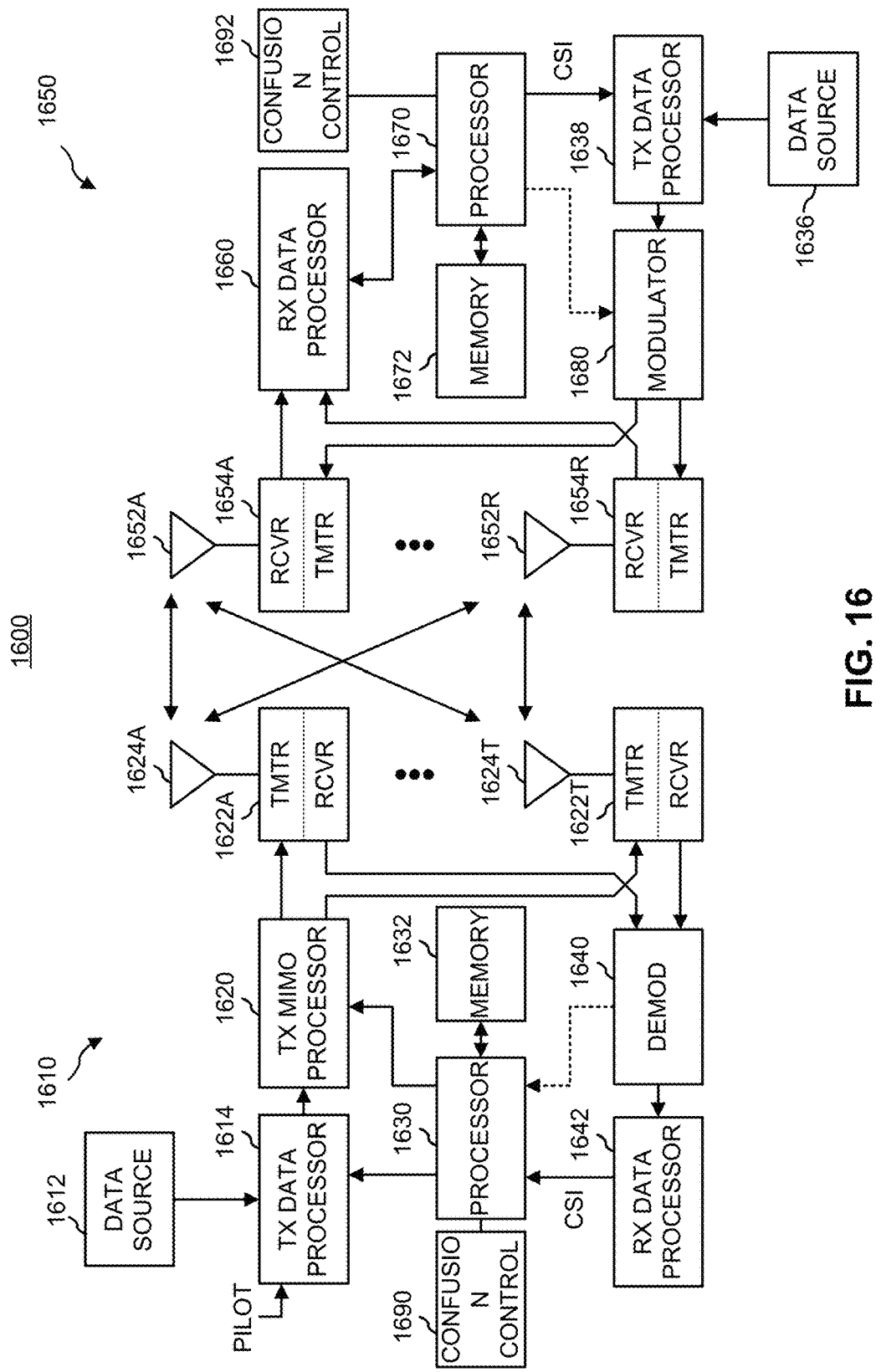
FIG. 16 is a simplified block diagram of several sample aspects of communication components.
Figure 17:
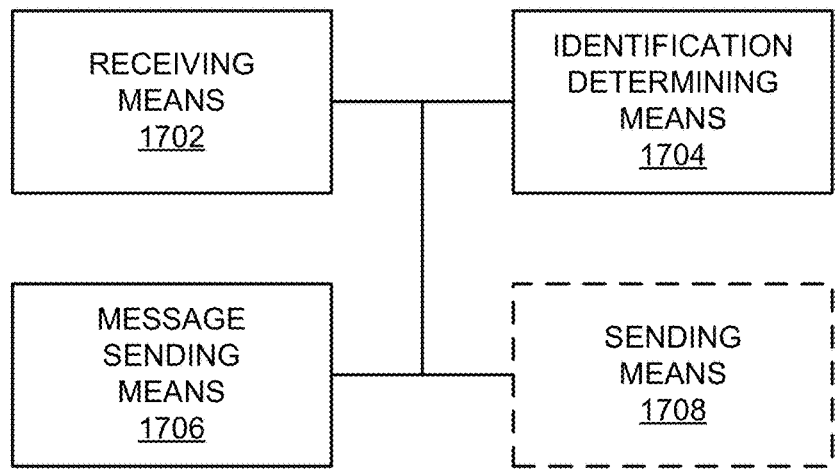
FIGS. 17-21 are simplified block diagrams of several sample aspects of apparatuses configured to resolve confusion as taught herein.
Figure 18:
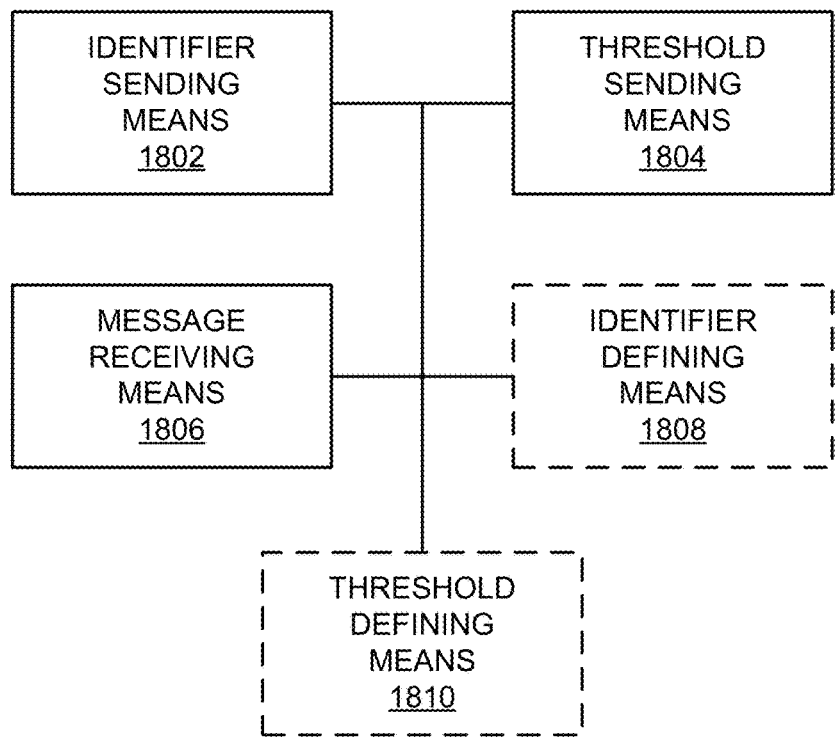
Figure 19:
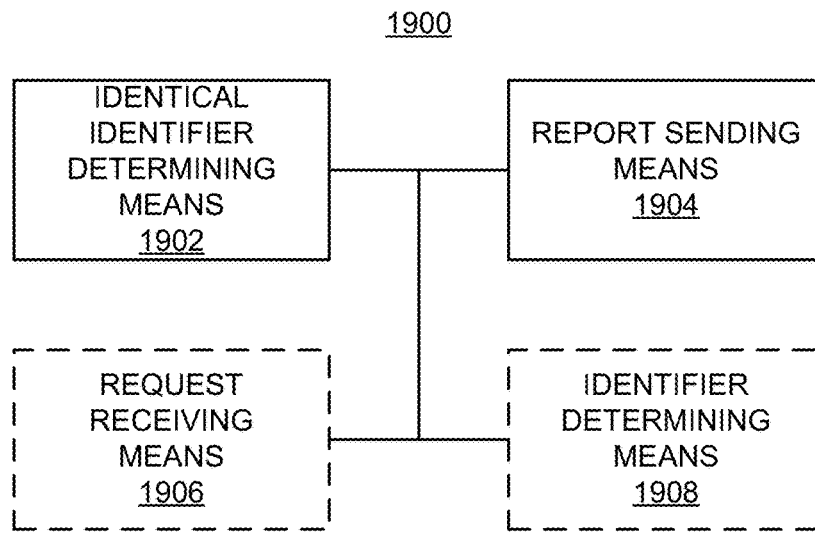
Figure 20:
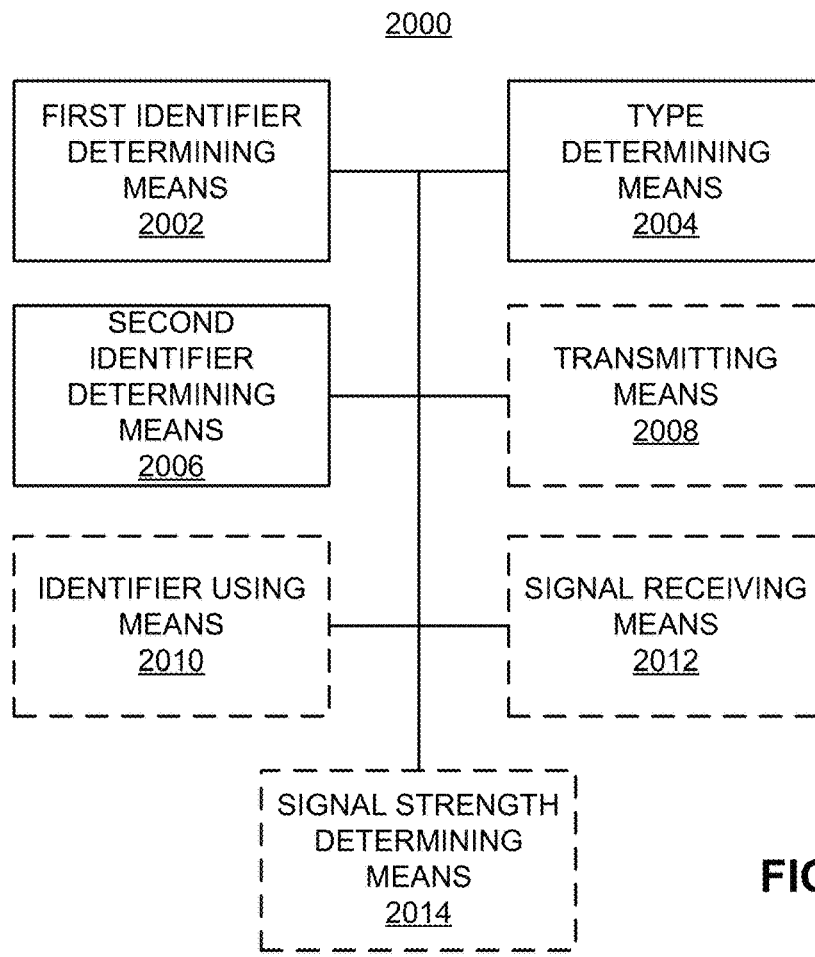
Figure 21:
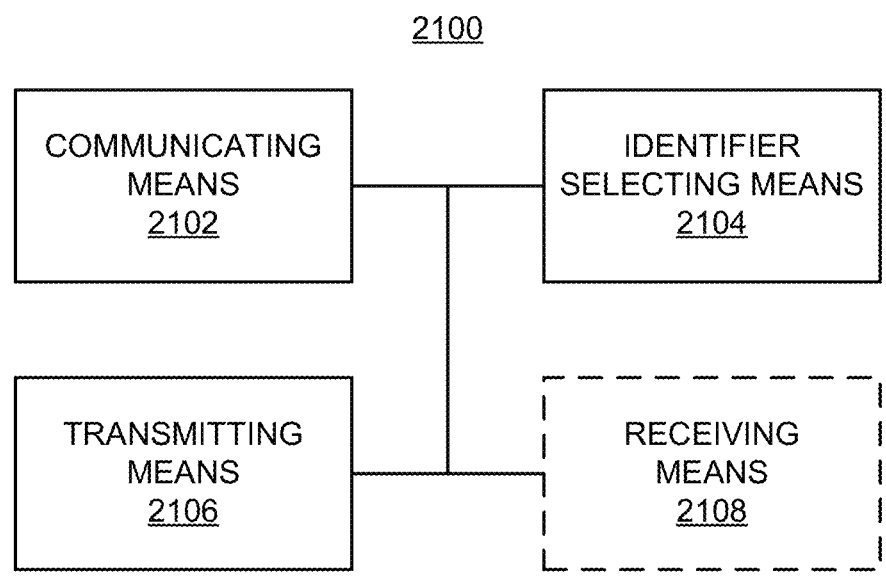

For illustration purposes, FIG. 16 describes sample communication components that may be employed in a wireless device in the context of a MIMO-based system 800. The system 1600 employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

The system 1600 may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

The system 1600 includes a wireless device 1610 (e.g., an access point) and a wireless device 1650 (e.g., an access terminal). At the device 1610, traffic data for a number of data streams is provided from a data source 1612 to a transmit ("TX") data processor 1614.

In some aspects, each data stream is transmitted over a respective transmit antenna. The TX data processor 1614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides $N_T$ modulation symbol streams to $N_T$ transceivers ("XCVR") 1622A through 1622T. In some aspects, the TX MIMO processor 1620 applies beam-forming weights to the symbols of the data streams and to the antenna from which the symbol is being transmitted.

Each transceiver 1622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1622A through 1622T are then transmitted from $N_T$ antennas 1624A through 1624T, respectively.

At the device 1650, the transmitted modulated signals are received by $N_R$ antennas 1652A through 1652R and the received signal from each antenna 1652 is provided to a respective transceiver ("XCVR") 1654A through 1654R. Each transceiver 1654 conditions (e.g., filters, amplifies, and downconverts) a respective received signal, digitizes the conditioned signal to provide samples, and further processes the samples to provide a corresponding "received" symbol stream.

A receive ("RX") data processor 1660 then receives and processes the $N_R$ received symbol streams from $N_R$ transceivers 1654 based on a particular receiver processing technique to provide $N_T$ "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which precoding matrix to use (discussed below). The processor 1670 formulates a reverse link message comprising a matrix index portion and a rank value portion. A data memory 1672 may store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1680, conditioned by the transceivers 1654A through 1654R, and transmitted back to the device 1610.

At the device 1610, the modulated signals from the device 1650 are received by the antennas 1624, conditioned by the transceivers 1622, demodulated by a demodulator ("DEMOD") 1640, and processed by a RX data processor 1642 to extract the reverse link message transmitted by the device 1650. The processor 1630 then determines which pre-coding matrix to use for determining the beam-forming weights then processes the extracted message.

FIG. 16 also illustrates that the communication components may include one or more components that perform confusion control operations as taught herein. For example, a confusion control component 1690 may cooperate with the processor 1630 and/or other components of the device 1610 to send/receive signals to/from another device (e.g., device 1650) as taught herein. Similarly, a confusion control component 1692 may cooperate with the processor 1670 and/or other components of the device 1650 to send/receive signals to/from another device (e.g., device 1610). It should be appreciated that for each device 1610 and 1650 the functionality of two or more of the described components may be provided by a single component. For example, a single processing component may provide the functionality of the confusion control component 1690 and the processor 1630 and a single processing component may provide the functionality of the confusion control component 1692 and the processor 1670.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 17-21, apparatuses 1700, 1800, 1900, 2000, and 2100 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 17-21 are optional.

The apparatuses 1700, 1800, 1900, 2000, and 2100 may include one or more modules that may perform one or more of the functions described above with regard to various figures. For example, a receiving means 1702, a message receiving means 1806, a request receiving means 1906, a signal receiving means 2012, or a receiving means 2108 may correspond to, for example, a receiver and/or a communication controller as discussed herein. An identification determining means 1704 or an identical identifier determining means 1902 may correspond to, for example, a confusion detector as discussed herein. A message sending means 1706, an identifier sending means 1802, an identifier defining means 1808, an identifier determining means 1908, a type determining means 2004, a second identifier determining means 2006, or an identifier selecting means 2104 may correspond to, for example, an identifier controller as discussed herein. A sending means 1706 or a transmitting means 2008 may correspond to, for example, a transmitter and/or a communication controller as discussed herein. A threshold sending means 1804 or a threshold defining means 1810 may correspond to, for example, a threshold controller as discussed herein. A report sending means 1904 may correspond to, for example, a report generator as discussed herein. A first identifier determining means 2002, an identifier using means 2010, a communicating means 2102, or a transmitting means 2106 may correspond to, for example, a communication controller as discussed herein. A signal strength determining means 2014 may correspond to, for example, a signal processor and/or a receiver as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

In view of the above, in some aspects a first method of communication comprises: receiving a message for a node identified by a first node identifier; determining whether another node is identified by the first node identifier; and sending, as a result of the determination, a message specifying use of a second node identifier to establish communication with the node. In addition, in some aspects at least one of the following also may apply to the first method of communication: determining whether another node is identified by the first node identifier comprises determining whether a plurality of cells use the specified cell identifier; the second node identifier uniquely identifies the node; the first node identifier is unique in a first region, and the second node identifier is unique in a second region that is larger than the first region; the message comprises a handover request, interference management signaling, a signal strength measurement report, or a message for reserving at least one resource; the method further comprises: receiving another message for the node, wherein the another message comprises the second node identifier, and tunneling the another message to the node; the determination comprises: conducting neighbor discovery, or determining whether the first identifier is found in a list of identifiers; the list of identifiers comprises a range; the message comprises an indication of the first node identifier, and the determination comprising comparing the indication with a list of node identifier indications; the list of node identifier indications comprises node identifiers that are common to more than one node in an area, and the node identifiers are received via another message or through neighbor discovery; the first node identifier comprises a physical cell identifier, a pilot identifier, or a pseudorandom number sequence, and the second node identifier comprises a cell global identifier, an access network identifier, or a sector identifier; the node comprises an access point; the node comprises a femto cell or a pico cell; the node is restricted to not provide, for at least one other node, at least one of: signaling, data access, registration, paging, or service.

In some aspects an apparatus for communication comprises: a receiver configured to receive a message for a node identified by a first node identifier; a confusion detector configured to determine whether another node is identified by the first node identifier; and an identifier controller configured to send, as a result of the determination, a message specifying use of a second node identifier to establish communication with the node.

In some aspects an apparatus for communication comprises: means for receiving a message for a node identified by a first node identifier; means for determining whether another node is identified by the first node identifier; and means for sending, as a result of the determination, a message specifying use of a second node identifier to establish communication with the node.

In some aspects a computer-program product comprises: computer-readable medium comprising codes for causing a computer to: receive a message for a node identified by a first node identifier; determine whether another node is identified by the first node identifier; and send, as a result of the determination, a message specifying use of a second node identifier to establish communication with the node.

In some aspects a second method of communication comprises: electing to transmit a message to a node identified by a first node identifier; determining whether another node may be identified by the first node identifier; and using a second node identifier to establish communication with the node based on the determination. In addition, in some aspects at least one of the following also may apply to the second method of communication: the second node identifier uniquely identifies the node; the first node identifier is unique in a first region, the second node identifier is unique in a second region that is larger than the first region; the message comprises a handover request, interference management signaling, a signal strength measurement report, or a message for reserving at least one resource; the determination comprises receiving a message indicative of whether the another node is identified by the first node identifier; the method further comprises transmitting a message comprising an indication of the first node identifier to establish the communication, wherein the determination comprises receiving a response to the message that specifies that the second node identifier is to be used to establish the communication; the determination comprises: attempting to communicate with the another node; and receiving a message from the another node indicating that communication is not authorized; the method further comprises using the second node identifier for a subsequent attempt to establish communication with the node; the first node identifier comprises a physical cell identifier, a pilot identifier, or a pseudorandom number sequence, and the second node identifier comprises a cell global identifier, an access network identifier, or a sector identifier; the node comprises an access point; the node comprises a femto cell or a pico cell; the node is restricted to not provide, for at least one other node, at least one of: signaling, data access, registration, paging, or service.

In some aspects an apparatus for communication comprises: a communication controller configured to elect to transmit a message to a node identified by a first node identifier; and a confusion detector configured to determine whether another node may be identified by the first node identifier; wherein the communication controller is further configured to use a second node identifier to establish communication with the node based on the determination.

In some aspects an apparatus for communication comprises: means for electing to transmit a message to a node identified by a first node identifier; means for determining whether another node may be identified by the first node identifier; and means for using a second node identifier to establish communication with the node based on the determination.

In some aspects a computer-program product comprises: computer-readable medium comprising codes for causing a computer to: elect to transmit a message to a node identified by a first node identifier; determine whether another node may be identified by the first node identifier; and use a second node identifier to establish communication with the node based on the determination.

In some aspects a third method of communication comprises: determining a first identifier for establishing communication with an access point; determining a type of the first identifier; and determining, based on the type of the first identifier, a second identifier for establishing communication with the access point. In addition, in some aspects at least one of the following also may apply to the third method of communication: the determining a type of the first identifier comprises receiving a message indicative of whether another node is identified by the first identifier; the method further comprises using the second identifier for a subsequent attempt to establish communication with the access point; the determining a type of the first identifier comprises determining whether a plurality of cells use identical cell identifiers of a first type; the method further comprises sending a measurement report that comprises a plurality of entries for the identical cell identifiers; the first identifier comprises a physical cell identifier associated with the access point, a pseudorandom number offset associated with the access point, or an acquisition pilot associated with the access point, and the second identifier comprises a global cell identifier associated with the access point, an Internet Protocol address associated with the access point, or an identifier that uniquely identifies the access point within a network; the determination of the second identifier is invoked to avoid confusion that would otherwise be caused by use of the first identifier when establishing communication with the access point; the determination of the second identifier is based on whether a value of the first identifier is one of a set of designated values; the set of designated values is associated with access points that are designated as not being confusion-free; the set of designated values is associated with a closed subscriber group; the set of designated values is associated with access points of at least one designated type; the at least one designated type relates to at least one of the group consisting of: transmit power, coverage area, and relay capabilities; the method further comprises receiving a list of the set of designated values from another access point; establishing the communication with the access point comprises transmitting the second identifier in conjunction with a signal strength measurement message, a radio resource report, or a handover request; the second identifier is transmitted to another access point that initiates a handover to the access point; the method further comprises transmitting a message to the access point using the second identifier; the access point comprises a femto cell or a pico cell; the access point serves a restricted set of at least one access terminal.

In some aspects an apparatus for communication comprises: a communication controller configured to determine a first identifier for establishing communication with an access point; and an identifier controller configured to determine, based on the first identifier, a second identifier for establishing communication with the access point.

In some aspects an apparatus for communication comprises: means for determining a first identifier for establishing communication with an access point; and means for determining, based on the first identifier, a second identifier for establishing communication with the access point.

In some aspects a computer-program product comprises: computer-readable medium comprising codes for causing a computer to: determine a first identifier for establishing communication with an access point; and determine, based on the first identifier, a second identifier for establishing communication with the access point.

In some aspects a fourth method of communication comprises: communicating with a first access point; selecting an identifier of a set of identifiers associated with the first access point; and transmitting the selected identifier to a second access point when establishing communication with the second access point. In addition, in some aspects at least one of the following also may apply to the fourth method of communication: the selection of the identifier is based on a node type associated with the first access point; the set of identifiers comprises a first identifier and a second identifier, and the selected identifier comprises the second identifier; the first identifier comprises a physical cell identifier associated with the first access point, a pseudorandom number offset associated with the first access point, or an acquisition pilot associated with the first access point, and the second identifier comprises a global cell identifier associated with the first access point, an Internet Protocol address associated with the first access point, or an identifier that uniquely identifies the first access point within a network; the second identifier is selected to avoid confusion that may otherwise be caused by use of the first identifier when establishing communication with the second access point; the selection of the identifier is based on whether a value of the first identifier is one of a set of designated values; the set of designated values is associated with at least one of the group consisting of: access points that are designated as not being confusion-free, a closed subscriber group, and access points of at least one designated type; the at least one designated type relates to at least one of the group consisting of: transmit power, coverage area, and relay capabilities; the method further comprises receiving a list of the set of designated values from the first access point; the selected identifier is transmitted in conjunction with a connection request; the selection of the identifier is triggered by a loss of communication with the first access point; the selected identifier is used by the second access point to establish communication with the first access point and/or to obtain configuration information from the first access point; the first access point comprises a femto cell or a pico cell; the first access point serves a restricted set of at least one access terminal.

In some aspects an apparatus for communication comprises: a communication controller configured to communicate with a first access point; and an identifier controller configured to select an identifier of a set of identifiers associated with the first access point; wherein the communication controller is further configured to transmit the selected identifier to a second access point when establishing communication with the second access point.

In some aspects an apparatus for communication comprises: means for communicating with a first access point; means for selecting an identifier of a set of identifiers associated with the first access point; and means for transmitting the selected identifier to a second access point when establishing communication with the second access point.

In some aspects a computer-program product comprises: computer-readable medium comprising codes for causing a computer to: communicate with a first access point; select an identifier of a set of identifiers associated with the first access point; and transmit the selected identifier to a second access point when establishing communication with the second access point.

In some aspects a fifth method of communication comprises: determining whether a plurality of cells use an identical cell identifier of a first type; and sending a request for a cell identifier of a second type associated with the cell identifier of the first type based on the determination. In addition, in some aspects at least one of the following also may apply to the fifth method of communication: the cell identifier of the first type comprises a physical cell identifier, and the cell identifier of the second type comprises a global cell identifier; the method further comprises receiving a measurement report that indicates that one of the cells uses a cell identifier that could cause confusion; the determination is based on neighbor discovery that indicates cell identifiers used by the cells; the determination is based on a received message that indicates that cell identifiers used by the cells; the method further comprises: receiving a response to the request, wherein the response comprise the cell identifier of the second type, and initiating a handover using the cell identifier of the second type; the cells comprise femto or pico cells; the method is performed by a base station.

In some aspects an apparatus for communication comprises: a confusion detector configured to determine whether a first cell and a second cell use an identical cell identifier of a first type; and an identifier controller configured to send a request for a cell identifier of a second type associated with the cell identifier of the first type based on the determination.

In some aspects an apparatus for communication comprises: means for determining whether a first cell and a second cell use an identical cell identifier of a first type; and means for sending a request for a cell identifier of a second type associated with the cell identifier of the first type based on the determination.

In some aspects a computer-program product comprises: computer-readable medium comprising codes for causing a computer to: determine whether a first cell and a second cell use an identical cell identifier of a first type; and send a request for a cell identifier of a second type associated with the cell identifier of the first type based on the determination.

In some aspects a sixth method of communication comprises: receiving a signal associated with a cell identifier; determining whether the cell identifier is one of a defined set of cell identifiers of a first type; determining whether a signal strength of the signal is greater than or equal to a threshold associated with the defined set of cell identifiers; acquiring a cell identifier of a second type identifier associated with the cell identifier if the cell identifier is one of a defined set of cell identifiers and the signal strength is greater than or equal to the threshold; and sending a message comprising the acquired cell identifier. In addition, in some aspects at least one of the following also may apply to the sixth method of communication: the cell identifiers of the first type comprise physical cell identifiers, and the cell identifier of the second type comprises a global cell identifier; the defined set comprises a subset of all cell identifiers of the first type, and the defined set identifies a cell identifier that may be assigned to multiple cells within a coverage area of another cell; acquisition of the cell identifier comprises receiving the cell identifier from a cell that transmitted the signal; the message comprises a measurement report; the method further comprises receiving a command to perform a handover to a cell associated with the acquired cell identifier as a result of sending the message; the method further comprises receiving the defined set of cell identifiers and the threshold over-the-air; the cell identifiers of the first type identify femto or pico cells; the method is performed by an access terminal.

In some aspects an apparatus for communication comprises: a receiver configured to receive a signal associated with a cell identifier; a comparator to determine whether the cell identifier is one of a defined set of cell identifiers of a first type; a signal processor configured to determine whether a signal strength of the signal is greater than or equal to a threshold associated with the defined set of cell identifiers; a identifier controller configured to acquire a cell identifier of a second type identifier associated with the cell identifier if the cell identifier is one of a defined set of cell identifiers and the signal strength is greater than or equal to the threshold; and a transmitter configured to send a message comprising the acquired cell identifier.

In some aspects an apparatus for communication comprises: means for receiving a signal associated with a cell identifier; means for determining whether the cell identifier is one of a defined set of cell identifiers of a first type; means for determining whether a signal strength of the signal is greater than or equal to a threshold associated with the defined set of cell identifiers; means for acquiring a cell identifier of a second type identifier associated with the cell identifier if the cell identifier is one of a defined set of cell identifiers and the signal strength is greater than or equal to the threshold; and means for sending a message comprising the acquired cell identifier.

In some aspects a computer-program product comprises: computer-readable medium comprising codes for causing a computer to: receive a signal associated with a cell identifier; determine whether the cell identifier is one of a defined set of cell identifiers of a first type; determine whether a signal strength of the signal is greater than or equal to a threshold associated with the defined set of cell identifiers; acquire a cell identifier of a second type identifier associated with the cell identifier if the cell identifier is one of a defined set of cell identifiers and the signal strength is greater than or equal to the threshold; and send a message comprising the acquired cell identifier.

In some aspects a seventh method of communication comprises: sending a defined set of cell identifiers of a first type to a node; sending a threshold associated with the defined set of cell identifiers to the node, wherein the threshold is for determining whether to acquire cell identifiers of a second type; and receiving a message from the node comprising one of the cell identifiers of the second type. In addition, in some aspects at least one of the following also may apply to the seventh method of communication: the cell identifiers of the first type comprise physical cell identifiers, and the cell identifiers of the second type comprise global cell identifiers; the defined set comprises a subset of a superset of cell identifiers of the first type, and the defined set identifies a cell identifier that may be assigned to multiple cells within a coverage area of another cell; the method further comprises defining the defined set of cell identifiers; the definition of the defined set of cell identifiers comprises identifying a plurality of neighbor cells that use a common cell identifier of the first type; the method further comprises defining the threshold; the message comprises a measurement report; the method further comprises instructing the node to perform a handover to a cell associated with the received cell identifier of the second type; the cell identifiers of the first type identify femto or pico cells; the method is performed by a base station.

In some aspects an apparatus for communication comprises: an identifier controller configured to send a defined set of cell identifiers of a first type to a node; a threshold controller configured to send a threshold associated with the defined set of cell identifiers to the node, wherein the threshold is for determining whether to acquire cell identifiers of a second type; and a receiver configured to receive a message from the node comprising one of the cell identifiers of the second type.

In some aspects an apparatus for communication comprises: means for sending a defined set of cell identifiers of a first type to a node; means for sending a threshold associated with the defined set of cell identifiers to the node, wherein the threshold is for determining whether to acquire cell identifiers of a second type; and means for receiving a message from the node comprising one of the cell identifiers of the second type.

In some aspects a computer-program product comprises: computer-readable medium comprising codes for causing a computer to: send a defined set of cell identifiers of a first type to a node; send a threshold associated with the defined set of cell identifiers to the node, wherein the threshold is for determining whether to acquire cell identifiers of a second type; and receive a message from the node comprising one of the cell identifiers of the second type.

In some aspects an eighth method of communication comprises: receiving a message comprising a specified cell identifier of a first type; determining whether a plurality of cells use the specified cell identifier; and sending a request for a cell identifier of a second type associated with the specified cell identifier based on the determination. In addition, in some aspects at least one of the following also may apply to the eighth method of communication: the cell identifier of the first type comprises a physical cell identifier, and the cell identifier of the second type comprises a global cell identifier; the message further comprises a first indication of receive signal strength of a first signal from a first one of the cells that use the specified cell identifier, the method further comprises determining whether a cell identifier confusion may occur based on the first indication of receive signal strength and a second indication of receive signal strength of a second signal from a second one of the cells that use the specified cell identifier, and the sending of the request is further based on the determination of whether the cell identifier confusion may occur; sending a defined set of cell identifiers of a first type to a node that sent the message, sending a threshold associated with the defined set of cell identifiers to the node, wherein the threshold is for determining whether to acquire cell identifiers of a second type; the defined set comprises a subset of a superset of cell identifiers of the first type, and the defined set identifies a cell identifier that may be assigned to multiple cells within a coverage area of another cell; the message comprises a measurement report; the method further comprises instructing the node to perform a handover to a cell associated with the received cell identifier of the second type; the cell identifier of the first type identifies a femto or pico cell; the method is performed by a base station.

In some aspects an apparatus for communication comprises: a receiver configured to receive a message comprising a specified cell identifier of a first type; a confusion detector configured to determine whether a plurality of cells use the specified cell identifier; and an identifier controller configured to send a request for a cell identifier of a second type associated with the specified cell identifier based on the determination.

In some aspects an apparatus for communication comprises: means for receiving a message comprising a specified cell identifier of a first type; means for determining whether a plurality of cells use the specified cell identifier; and means for sending a request for a cell identifier of a second type associated with the specified cell identifier based on the determination.

In some aspects a computer-program product comprises: computer-readable medium comprising codes for causing a computer to: receive a message comprising a specified cell identifier of a first type; determine whether a plurality of cells use the specified cell identifier; and send a request for a cell identifier of a second type associated with the specified cell identifier based on the determination.

In some aspects a ninth method of communication comprises: determining whether a plurality of cells use identical cell identifiers of a first type; and sending a measurement report that comprises a plurality of entries for the identical cell identifiers. In addition, in some aspects at least one of the following also may apply to the ninth method of communication: the method further comprises determining cell identifiers of a second type associated with the identical cell identifiers, and the measurement report further comprises the cell identifiers of a second type; the cell identifiers of the first type comprise physical cell identifiers, and the cell identifiers of the second type comprise global cell identifiers; the determination comprises receiving signals from a plurality of cells, and the signals comprise the identical cell identifiers; the cells comprise femto or pico cells; the method is performed by an access terminal.

In some aspects an apparatus for communication comprises: a confusion detector configured to determine whether a plurality of cells use identical cell identifiers; and a measurement report generator configured to send a measurement report that comprises a plurality of entries for the identical cell identifiers.

In some aspects an apparatus for communication comprises: means for determining whether a plurality of cells use identical cell identifiers; and means for sending a measurement report that comprises a plurality of entries for the identical cell identifiers.

In some aspects a computer-program product comprises: computer-readable medium comprising codes for causing a computer to: determine whether a plurality of cells use identical cell identifiers; and send a measurement report that comprises a plurality of entries for the identical cell identifiers.

In some aspects a tenth method of communication comprises: determining whether a plurality of cells use identical cell identifiers; and sending a measurement report based on the determination. In addition, in some aspects at least one of the following also may apply to the tenth method of communication: the method further comprises receiving a request for confusion information; the measurement report is sent in response to the request, and comprises an indication of the determination; the identical cell identifiers comprise physical cell identifiers; the cells comprise cells from which synchronization signals and/or pilot signals are currently being received; the cells comprise cells from which synchronization signals and/or pilot signals we received during a defined period of time; the cells comprise cells from which synchronization signals and/or pilot signals we received during a period of time associated with a defined number of handovers; the identical cell identifiers are cell identifiers of a first type, the method further comprises determining cell identifiers of a second type associated with the identical cell identifiers, and the measurement report further comprises the cell identifiers of a second type; the cell identifiers of the first type comprise physical cell identifiers, and the cell identifiers of the second type comprise global cell identifiers; the determination comprises receiving signals from a plurality of cells, and the signals comprise the identical cell identifiers; the cells comprise femto or pico cells; the method is performed by an access terminal.

In some aspects an apparatus for communication comprises: a confusion detector configured to determine whether a plurality of cells use identical cell identifiers; and a measurement report generator configured to send a measurement report based on the determination.

In some aspects an apparatus for communication comprises: means for determining whether a plurality of cells use identical cell identifiers; and means for sending a measurement report based on the determination.

In some aspects a computer-program product comprises: computer-readable medium comprising codes for causing a computer to: determine whether a plurality of cells use identical cell identifiers; and send a measurement report based on the determination.

In view of the above, in some aspects an eleventh method of communication comprises: receiving a request for confusion information; determining whether a plurality of cells use identical cell identifiers; and sending a message in response to the request, wherein the message comprises an indication of the determination. In addition, in some aspects at least one of the following also may apply to the eleventh method of communication: the identical cell identifiers comprise physical cell identifiers; the request for confusion information relates to a specified cell identifier; the message is sent as a result of a determination that the plurality of cells use identical cell identifiers; the request comprises a request for a measurement report; the message comprises a measurement report; the cells comprise femto or pico cells; the method is performed by an access terminal.

In some aspects an apparatus for communication comprises: a receiver configured to receive a request for confusion information; a confusion detector configured to determine whether a plurality of cells use identical cell identifiers; and a transmitter configured to send a message in response to the request, wherein the message comprises an indication of the determination.

In some aspects an apparatus for communication comprises: means for receiving a request for confusion information; means for determining whether a plurality of cells use identical cell identifiers; and means for sending a message in response to the request, wherein the message comprises an indication of the determination.

In some aspects a computer-program product comprises: computer-readable medium comprising codes for causing a computer to: receive a request for confusion information; determine whether a plurality of cells use identical cell identifiers; and send a message in response to the request, wherein the message comprises an indication of the determination.

In some aspects, functionality corresponding to one or more of the above aspects relating to the first, second, third, fourth, fifth, sixth, seventh, eight, ninth, tenth, and eleventh methods of communication may be implemented, for example, in an apparatus using structure as taught herein. In addition, a computer-program product may comprise codes configured to cause a computer to provide functionality corresponding to one or more of the above aspects relating to the first, second, third, fourth, fifth, sixth, seventh, eight, ninth, tenth, and eleventh methods of communication.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
communicating by an access terminal with a first access point, wherein the first access point is a source node in a handover of the access terminal from the source node to a target node;
selecting, by the access terminal and without being instructed by the first access point, an identifier of a set of identifiers associated with the first access point, wherein the selected identifier allows a second access point to uniquely identify the first access point, wherein the second access point is the target node, wherein the set of identifiers includes a first identifier and a second identifier, and wherein the selecting of the identifier is based on whether a value of the first identifier is one of a set of designated values; and
transmitting the selected identifier from the access terminal to the second access point when establishing communication with the second access point for the handover.

2. The method of claim 1, wherein the selection of the identifier is further based on a node type associated with the first access point.

3. The method of claim 1, wherein:
the selected identifier comprises the second identifier.

4. The method of claim 3, wherein:
the first identifier comprises a physical cell identifier associated with the first access point, a pseudorandom number offset associated with the first access point, or an acquisition pilot associated with the first access point; and
the second identifier comprises a global cell identifier associated with the first access point, an Internet Protocol address associated with the first access point, or an identifier that uniquely identifies the first access point within a network.

5. The method of claim 1, wherein the set of designated values is associated with at least one of the group consisting of: access points that are designated as not being confusion-free, a closed subscriber group, and access points of at least one designated type.

6. The method of claim 5, wherein the at least one designated type relates to at least one of the group consisting of: transmit power, coverage area, and relay capabilities.

7. The method of claim 1, further comprising receiving a list of the set of designated values from the first access point.

8. The method of claim 1, wherein the selection of the identifier is triggered by a loss of communication with the first access point.

9. An apparatus for communication, comprising:
a memory; and
at least one processor coupled to the memory and configured to:
communicate with a first access point, wherein the first access point is a source node in a handover of the apparatus from the source node to a target node;
select, by the apparatus and without being instructed by the first access point, an identifier of a set of identifiers associated with the first access point, wherein the selected identifier allows a second access point to uniquely identify the first access point, wherein the second access point is the target node, wherein the set of identifiers includes a first identifier and a second identifier, and wherein the selection of the identifier is based on whether a value of the first identifier is one of a set of designated values; and
transmit the selected identifier from the apparatus to the second access point when establishing communication with the second access point for the handover.

10. The apparatus of claim 9, wherein the at least one processor is further configured to select the identifier based on a node type associated with the first access point.

11. The apparatus of claim 9, wherein:
the selected identifier comprises the second identifier.

12. The apparatus of claim 11, wherein:
the first identifier comprises a physical cell identifier associated with the first access point, a pseudorandom number offset associated with the first access point, or an acquisition pilot associated with the first access point; and
the second identifier comprises a global cell identifier associated with the first access point, an Internet Protocol address associated with the first access point, or an identifier that uniquely identifies the first access point within a network.

13. The apparatus of claim 9, wherein the set of designated values is associated with at least one of the group consisting of: access points that are designated as not being confusion-free, a closed subscriber group, and access points of at least one designated type.

14. The apparatus of claim 13, wherein the at least one designated type relates to at least one of the group consisting of: transmit power, coverage area, and relay capabilities.

15. The apparatus of claim 9, wherein the at least one processor is further configured to receive a list of the set of designated values from the first access point.

16. The apparatus of claim 9, wherein the selection of the identifier is triggered by a loss of communication with the first access point.

17. An apparatus for communication, comprising:
means for communicating with a first access point, wherein the first access point is a source node in a handover of the apparatus from the source node to a target node;
means for selecting, by the apparatus and without being instructed by the first access point, an identifier of a set of identifiers associated with the first access point, wherein the selected identifier allows a second access point to uniquely identify the first access point, wherein the second access point is the target node, wherein the set of identifiers includes a first identifier and a second identifier, and wherein the selection of the identifier is based on whether a value of the first identifier is one of a set of designated values; and
means for transmitting the selected identifier from the apparatus to the second access point when establishing communication with the second access point for the handover.

18. The apparatus of claim 17, wherein the selection of the identifier is further based on a node type associated with the first access point.

19. The apparatus of claim 17, wherein:
the selected identifier comprises the second identifier.

20. The apparatus of claim 19, wherein:
the first identifier comprises a physical cell identifier associated with the first access point, a pseudorandom number offset associated with the first access point, or an acquisition pilot associated with the first access point; and
the second identifier comprises a global cell identifier associated with the first access point, an Internet Protocol address associated with the first access point, or an identifier that uniquely identifies the first access point within a network.

21. The apparatus of claim 17, wherein the set of designated values is associated with at least one of the group consisting of: access points that are designated as not being confusion-free, a closed subscriber group, and access points of at least one designated type.

22. The apparatus of claim 21, wherein the at least one designated type relates to at least one of the group consisting of: transmit power, coverage area, and relay capabilities.

23. The apparatus of claim 17, further comprising a means for receiving a list of the set of designated values from the first access point.

24. The apparatus of claim 17, wherein the selection of the identifier is triggered by a loss of communication with the first access point.

25. A non-transitory computer-readable medium of a communication apparatus storing executable codes for wireless communication, comprising codes for causing the communication apparatus to:
communicate with a first access point, wherein the first access point is a source node in a handover of the apparatus from the source node to a target node;
select, by the communication apparatus and without being instructed by the first access point, an identifier of a set of identifiers associated with the first access point so that a second access point is allowed to resolve any confusion about the identity of the first access point, wherein the second access point is the target node, wherein the set of identifier includes a first identifier and a second identifier, and wherein the selection of the identifier is based on whether a value of the first identifier is one of a set of designated values; and
transmit the selected identifier from the communication apparatus to the second access point when establishing communication with the second access point for the handover.

26. The non-transitory computer-readable medium of claim 25, wherein the selection of the identifier is further based on a node type associated with the first access point.

27. The non-transitory computer-readable medium of claim 25, wherein:
the first identifier comprises a physical cell identifier associated with the first access point, a pseudorandom number offset associated with the first access point, or an acquisition pilot associated with the first access point;
the second identifier comprises a global cell identifier associated with the first access point, an Internet Protocol address associated with the first access point, or an identifier that uniquely identifies the first access point within a network; and
the selected identifier comprises the second identifier.

* * * * *